United States Patent [19]

Blanco

[11] Patent Number: 4,676,129
[45] Date of Patent: Jun. 30, 1987

[54] AUTOMATED TRUSS COMPONENT SAW APPARATUS

[75] Inventor: Antonio Blanco, Hieleah, Fla.
[73] Assignee: Gang-Nail Systems, Inc., Miami, Fla.
[21] Appl. No.: 657,242
[22] Filed: Oct. 2, 1984
[51] Int. Cl.[4] .............................................. B27B 5/04
[52] U.S. Cl. ........................................ 83/71; 83/155; 83/404.1; 83/425.2; 83/432; 83/433; 83/581; 83/699
[58] Field of Search ............... 83/71, 404.1, 425.2, 83/432, 581, 433, 435.2, 68, 155.1, DIG. 1, 698–700

[56] References Cited

U.S. PATENT DOCUMENTS

| | | | |
|---|---|---|---|
| 3,229,732 | 1/1966 | Mayo | 83/435.2 X |
| 3,757,625 | 9/1973 | Pfenning et al. | 83/404.1 |
| 3,952,620 | 4/1976 | Adams | 83/422 |
| 4,026,199 | 5/1977 | Adams et al. | 83/155.1 X |
| 4,085,638 | 4/1978 | Fifer | 83/71 |
| 4,145,940 | 3/1972 | Woloveke et al. | 83/68 |
| 4,277,998 | 7/1981 | Mayo | 83/432 X |
| 4,467,684 | 8/1984 | Thorsell | 83/404.1 |

*Primary Examiner*—James M. Meister
*Assistant Examiner*—John L. Knoble
*Attorney, Agent, or Firm*—Lowe, Price, LeBlanc, Becker & Shur

[57] ABSTRACT

A truss component saw apparatus having multiple saws arranged in two sets for providing a variety of angular cut-offs for lumber lengths. The saws in each set are arranged for adjustment movements involving from 1 to 4 degrees of freedom of movement. An automatic control mechanism is provided for automated adjustment of the saws to predetermined positions. The degrees of freedom are linear, pivotal, and movement within an X-Y coordinate plane arranged substantially perpendicular with respect to the pivot axis established by the saws within a given set of saws. A lumber conveyor system is provided for the apparatus.

14 Claims, 25 Drawing Figures

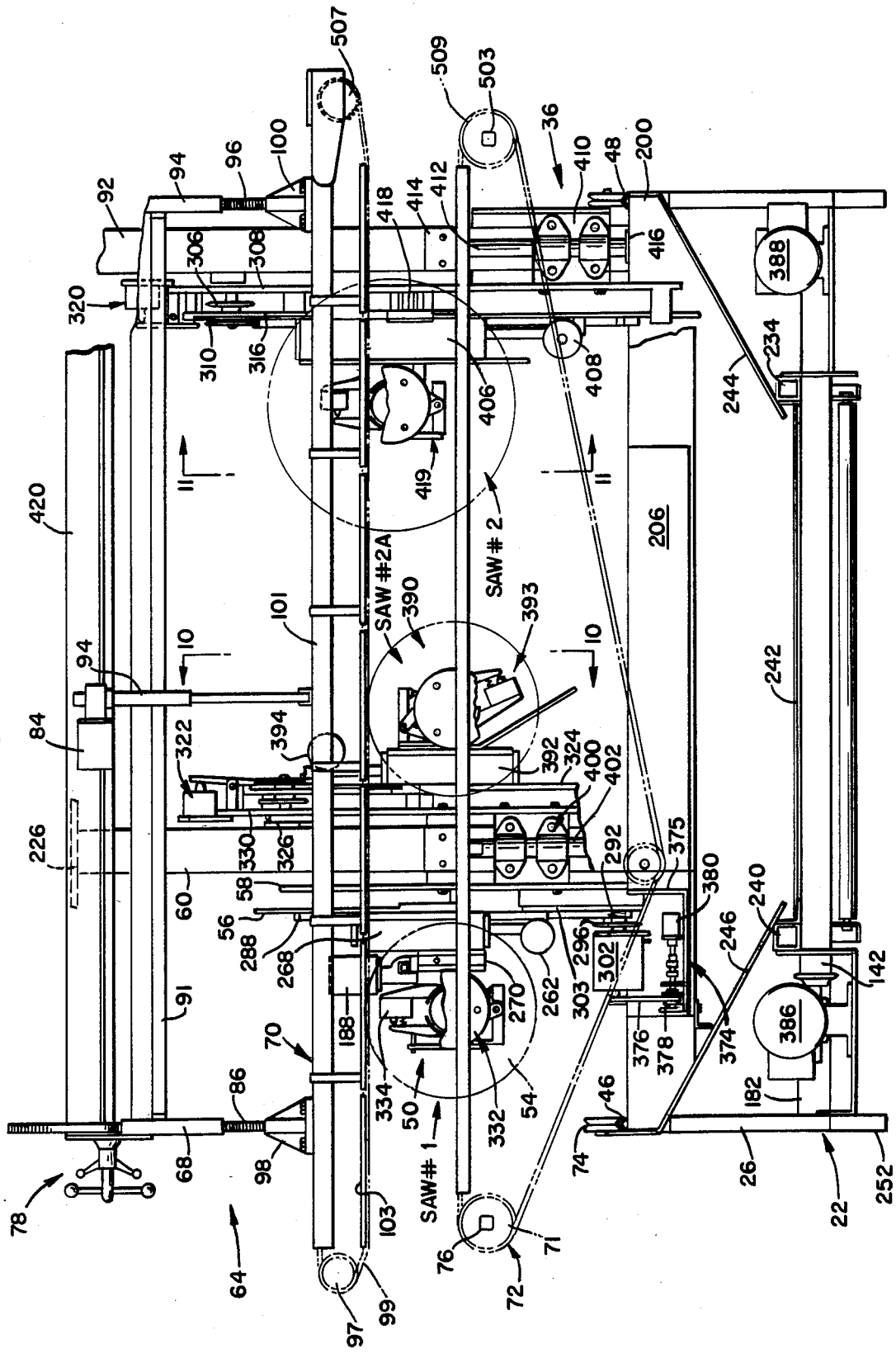

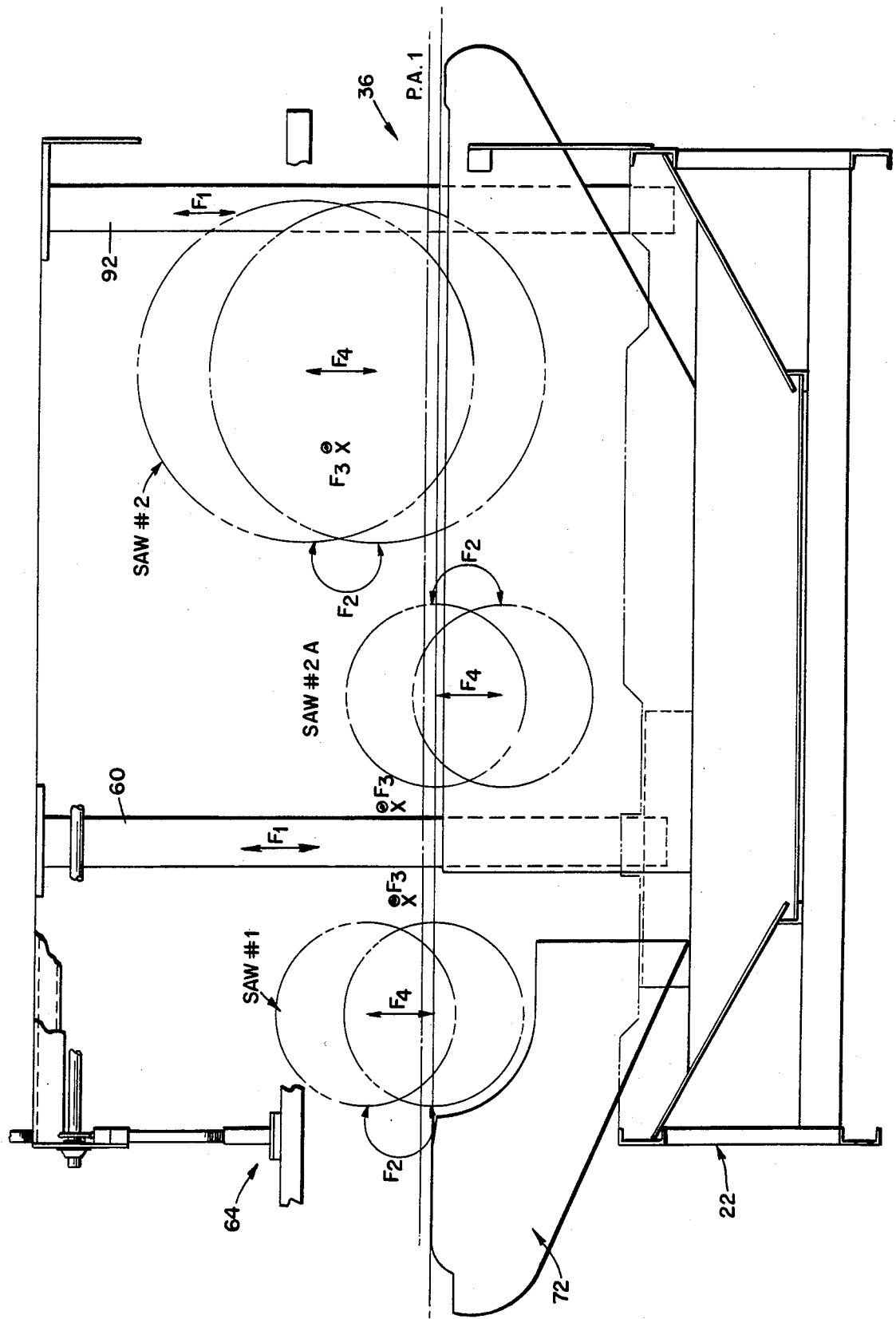

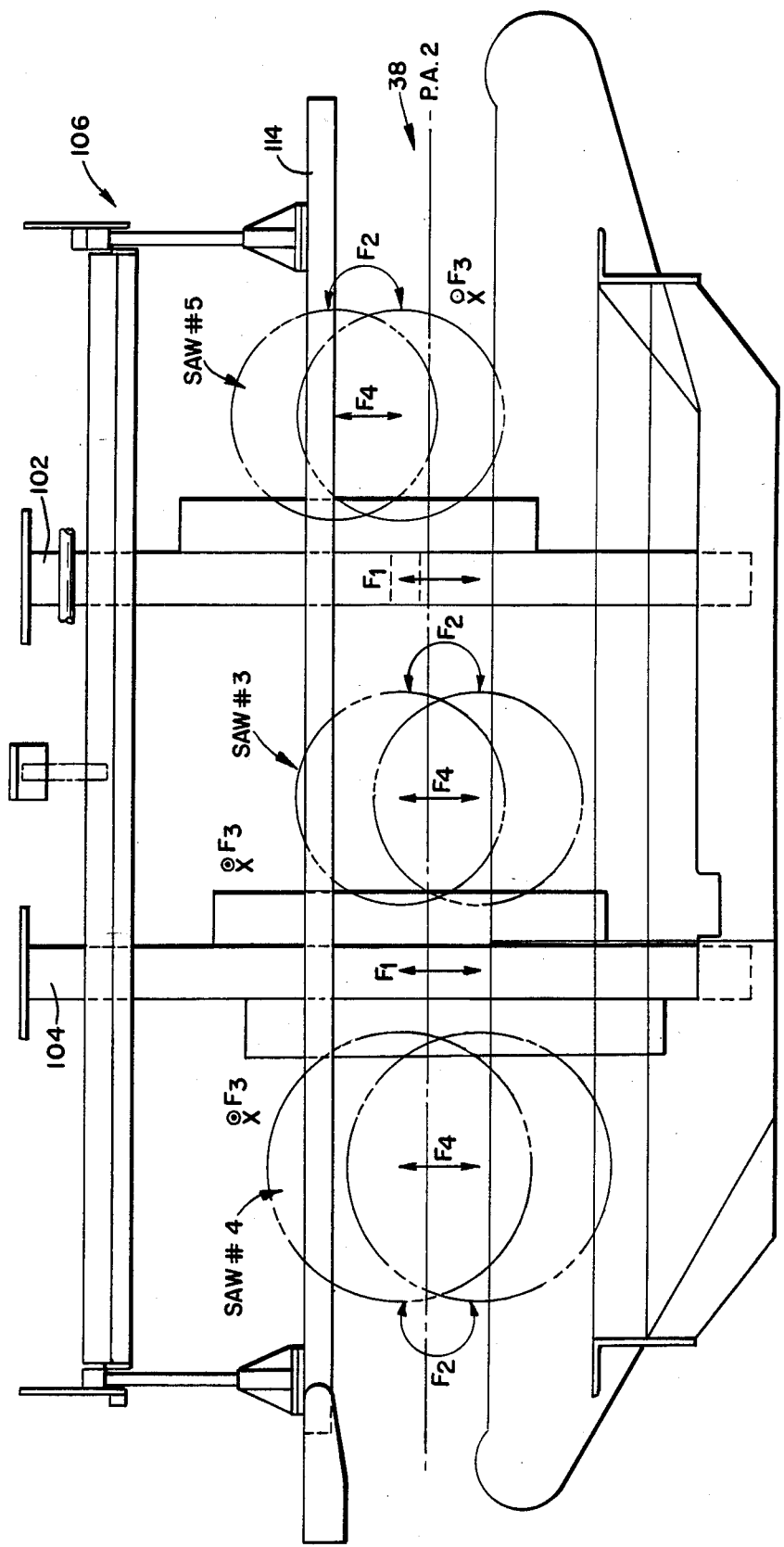

AUTOMATED TRUSS COMPONENT SAW APPARATUS

TECHNICAL FIELD

The present application relates to an automated saw apparatus for cutting lengths of lumber into truss components of specified lengths and with predetermined angular and squared cuts made thereon. Either four or six saw blades are provided in two sets and within which the individual saw blades are mounted for high speed and automatic movement to predetermined positions as required for making different angular and squared cuts to produce a wide range of component shapes.

BACKGROUND OF THE INVENTION

Truss component saws in the prior art have generally taken the form of a horizontal base frame on which are mounted a first set of one or more saws in a stationary frame at one end of the base frame and a second set of saws mounted in a movable carriage which can be reciprocated along the base frame. The horizontal movement of the carriage permits truss components of differing lengths to be produced.

A feed-in conveyor system is also provided on the component saw for the controlled feeding of lengths of lumber into the saw blade sets. A waste conveyor is arranged in the base to carry off sawdust and the cut off portions.

U.S. Pat. No. 4,277,993 to Mayo shows this type of a component saw wherein a pantograph movement linkage is provided for rotating each of the circular saw blades about a full 180° movement about the axis of a chord on each of the saw blades. The chords on the saw blades in each set are positioned along a common pivot axis. In this U.S. patent angular movement of each of the saw blades is controlled by the pantograph movement linkage which is in turn powered by a gear movement which is not further described. Each of the saw blades is also vertically movable by manual adjustment through a top crank handle. The saw blades thus move vertically and rotate about the pivot axis so that only two degrees of movement are provided. This limited two degrees of movement of the saw blade in different directions restricts the type of cuts which can be made by this saw apparatus. The absence of an automated angular positioning system on this saw then requires excessive adjustment and set up time expenditure for each type of component which is run through the saw.

U.S. Pat. No. 4,476,684 to Thorsell shows an apparatus for supporting two circular saw blades for cutting wooden trusses which also employs a pantograph linkage. Means are provided in this saw for making minor additional positioning adjustments manually by use of several bolt and slot arrangements. Such adjustment means are not useable when switching from one component cut to the next in a series of such cuts which are normally made during truss component production. A vertical adjustment for the saw mounting is also provided on this unit. No automated saw adjustment mechanism is provided for making high speed adjustments.

Other component saws in which pantograph linkages are employed for achieving various angular settings of the circular saws are U.S. Pat. Nos. 3,229,732 and 3,380,494 both to Mayo.

U.S. Pat. No. Re 25,715 to Mayo shows a four saw truss component machine which has segmental gear indicia scales and pointers for displaying angular positions. One or more of the saws are also provided with a vertical adjustability feature through a manually operated screw crank.

Other similar saw machinery is disclosed in U.S. Pat. Nos. 3,665,982 to Kvalheim; 3,952,620 to Adams and 4,131,143; 4,316,400 and 3,085,895 all to Mayo.

U.S. Pat. No. 3,662,795 to Heflin shows an apparatus for forming stakes in which various angular settings are employed for circular saws. U.S. Pat. No. 4,293,011 to White et al describes a rafter cutting machine.

The truss component saws employed in the industry have not provided for automated angular positioning of the saw blades which is needed if the set up time between successive component cuts is to be minimized for higher productivity in the truss manufacturing business. Also the range of component cuts which can be made on these existing saws is restricted due to the low number of degrees of freedom within which the saw blades can be moved.

The production of building trusses is now evolving into a computer aided design and computer aided manufacturing (CAD/CAM) production process. A builder specifies particular configurations for a given building job such as the needed length and pitch for a series of roof trusses. The truss manufacturer is then responsible for designing the appropriate trusses, cutting the truss components and assembling the same. The truss manufacturer then programs a given truss order through the plant with the aid of computer generated information so that each of the varying components of the truss can be serially produced on one or more component saws without the buildup of large inventories of given truss components. It is now becoming essential for the profitability of such truss manufacturers that large inventory levels for the truss components not accumulate but rather that all components cut in a particular run be immediately used for fabrication. This required low inventory practice then requires the component saws to be adjusted quickly to different angular positions for the successive components which must be produced prior to fabrication of a given job order which may range from 20 to 30 different components in amounts ranging from about 10 to 500 pieces.

The angular adjustability of the component saw blades is presently accomplished largely by hand setting operations wherein scales and pointers are provided so that the operator can properly position each of the saw blades. Such scale and pointer systems are generally accurate to within a range of several degrees. More importantly, valuable production time is expended in achieving the angular settings which must be made for the successive series of component cuts in order to fill a particular job order. When the set up and adjustment time is a high proportion of the total sawing time productivity is unacceptably low. The evolving commercial practice of filling given building job orders in a single production run makes such manual adjustments unacceptable.

It is therefore important to achieve a fast angular positioning and low set up time for each of the successive components to be run through the machine.

In addition to the requirement that the set up and adjustment time between successive cutting runs for the truss components be held to a minimum in order to increase productivity it is also necessary to make a wide range of different angular cuts. It is insufficient to merely provide for the saws to pivot across a large angular range such as 180° or even 360°. In order to make certain cuts such as long scarf cuts it is necessary not only to angularly position the saw blade but to then move the saw blade radially with respect to the pivot axis and to also move the saw along a chord across the blade spaced from the pivot axis. This type of saw blade adjustability has not heretofore been employed in truss component saws. Such additional adjustability for saw blade positioning permits the blades to be adjusted so that the component cuts can be made across long chord lengths of the circular saw blades. This optimises the cutting performance of the blade and permits longer lengths of angular cuts.

SUMMARY OF THE INVENTION

The truss component saw apparatus of the present invention has a base frame on which is affixed a stationary frame for supporting a first set of either two or three circular saws. A second set of saws are adjustably mounted in a carriage which moves across the base frame with respect to the stationary frame. A lumber conveyor system is provided on each of the stationary frame and the movable carriage for holding lengths of lumber as these are fed through the component saw for production of the truss components by making different angular cuts on the ends or other portions thereof.

The individual circular saw blades are powered by motors which are adjustably mounted within the stationary frame and the movable carriage.

Two support frames are mounted within the stationary frame for supporting the first set of saw motors. These mounting frames are spaced from one another in the direction of lumber movement and these frames can support either two or four saws. A similar two mounting frames are provided in the movable carriage also for mounting either two or four saws in the second set of saws.

A first degree of movement is provided for each of the saws by means of a mounting plate which is automatically vertically adjustable with respect to each of the mounting frames. A segmental gear angulation plate is mounted for pivotal movement on the mounting plates so that each of the circular saws can be pivoted about a pivot axis. The individual saw motors are then mounted upon the segmental gear angulation plates by an automated mechanism which permits movement of the saw motors in an x-y coordinate plane which is positioned perpendicularly with respect to the pivot axis of the angulation plates. The adjustment of the saw motors on the angulation plate thus provides a third and a fourth degree of freedom for movement of the saw blade. The movement of the saw motors automatically within an x-y coordinate plane permits the saw blades to be positioned for maximum effectiveness for any particular cut being made by the component saw. The angular position established by adjustment of the angulation plate can be maintained during the x-y coordinate adjustment of the saw blade.

The compound linear; pivotal; and x-y coordinate movement for each of the saw blades permits the circular saw blades to be first angularly adjusted and thereafter positioned for maximum cutting effectiveness by utilizing longer chord lengths across the circular saw face for each of the component cuts being made. This is particularly advantageous when making long scarf cuts on the truss components.

An automatic positioning mechanism is provided for the displaying of preselected saw positioning indicia such as angular degrees and blade cutting chord lengths. This mechanism includes an automatic positioning system for moving the saw blade to the predetermined and displayed position. The automatic positioning mechanism for each of the saw blades permits the operator to quickly and accurately set the saw blade to different positions for making various truss component cuts.

The productivity of the component saw herein described is improved over the prior art saws by providing the automatic saw positioning mechanism in which the angular and the additional position adjustments of the saws can be quickly and efficiently made with high accuracy maintained.

This saw positioning mechanism permits a predetermined blade position to be displayed on a digital readout and to then lock into the automatic positioning system a command to position the saw to the displayed position indication. The mechanism will then move the saw blade accurately to the displayed predetermined position. The automated mechanism is capable of displaying and automatically adjusting the saw blades in four degrees of freedom. One of these degrees of freedom is the angular positioning about the pivot axis. Two of the other degrees of freedom are movement within an x-y coordinate plane which is positioned perpendicularly with respect to the pivot axis. This type of coordinate automatic movement permits the saw blade to be moved radially with respect to the pivot axis and about the pivot axis along various preselected chord lengths spaced from the pivot axis.

Through the use of the herein described component saw higher precision of positioning the circular saw blades is achieved and higher productivity is permitted by means of the faster adjustability and lower set up times achieved through the use of automatic positioning mechanism.

The component saw apparatus of the present invention is constructed with at least one of the saws having the full four degrees of movement capability. If desired all of the four or six saws can be mounted for the full four degrees of freedom.

It is therefore an object of the present invention to provide a truss component saw apparatus having either four or six saw blades arranged in two sets in which one or more of the saws are mounted for four degrees of movement.

Another object of the invention is to provide compound movement of at least one of the mounted saw blades by mounting the saw to have an x-y coordinate movement in a plane arranged perpendicular to the pivot axis of the saw blades.

Yet another object of the present invention is to provide a truss component saw apparatus having an automatic positioning mechanism associated therewith for moving the individually mounted saws to predetermined and displayed positions.

Another object of the present invention is to provide an automated truss component saw apparatus which permits the high productivity of truss components without manual set up and adjustments between various truss components in a job run involving the production of multiple differently designed components.

Yet another object of the invention is to provide a manufacturing process for the production of truss components wherein automatic positioning of the saw blades is achieved through a feed-back control loop.

These and other objects of the invention will become apparent from the drawings and descriptions setforth below.

BRIEF DESCRIPTION OF THE DRAWINGS

FIG. 4A is a detailed side elevation view of the stationary frame taken on line 4A—4A of FIG. 1;

FIG. 5A is a schematic diagram of the stationary frame of the present invention showing the compound vertical movements; the pivotal movement; and x-y coordinate movements of the component saws mounted in the stationary frame;

FIG. 5B is a schematic view of the movable carriage showing the compound vertical movements, the pivotal movement, and the x-y coordinate movements of the mounted component saws;

DETAILED DESCRIPTION OF THE PREFERRED EMBODIMENTS

Figure 1:
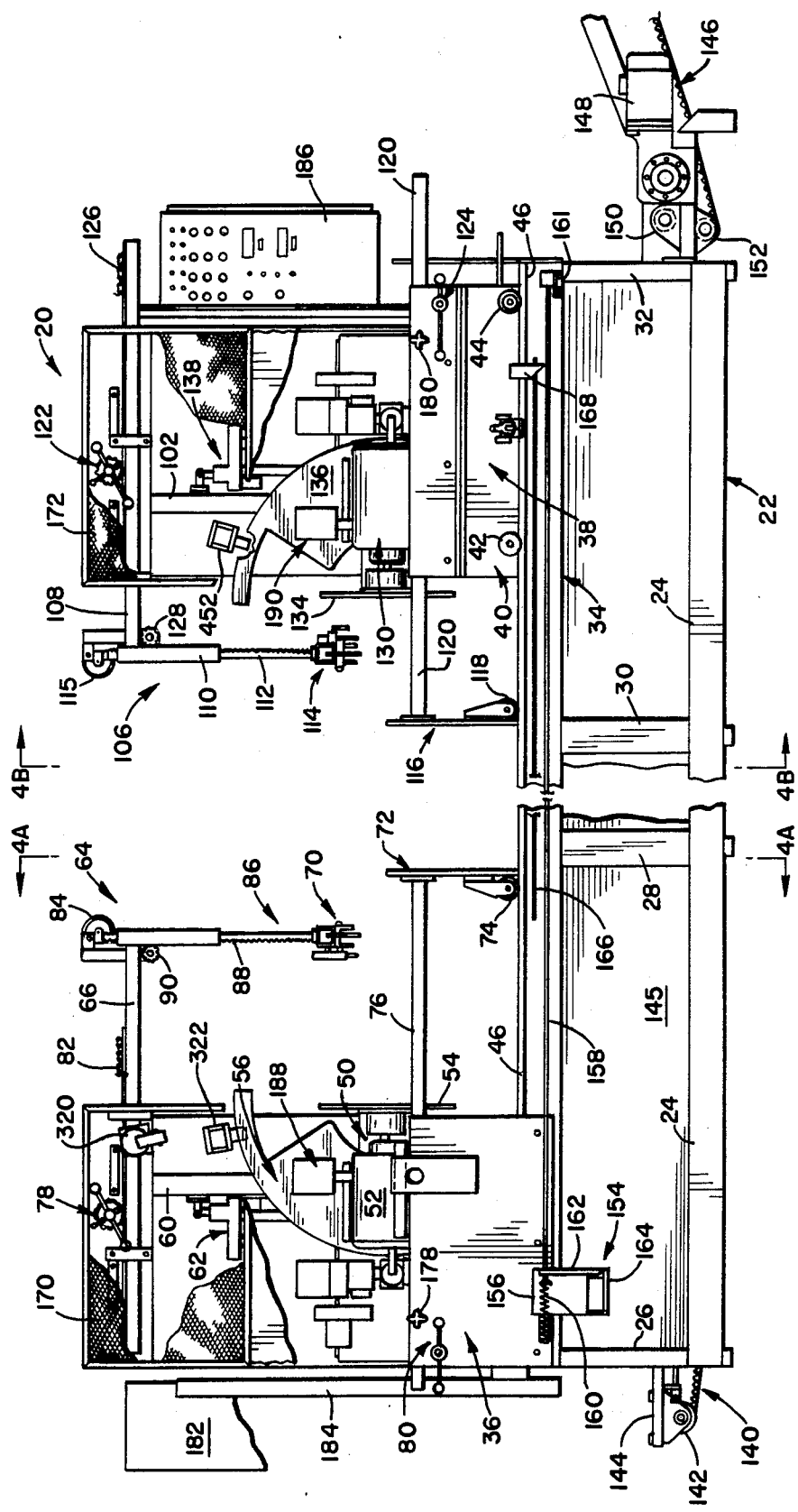
FIG. 1 is a front elevation general view of the automated truss component saw apparatus of the present invention showing the stationary frame and the movable carriage.
Figure 4B:
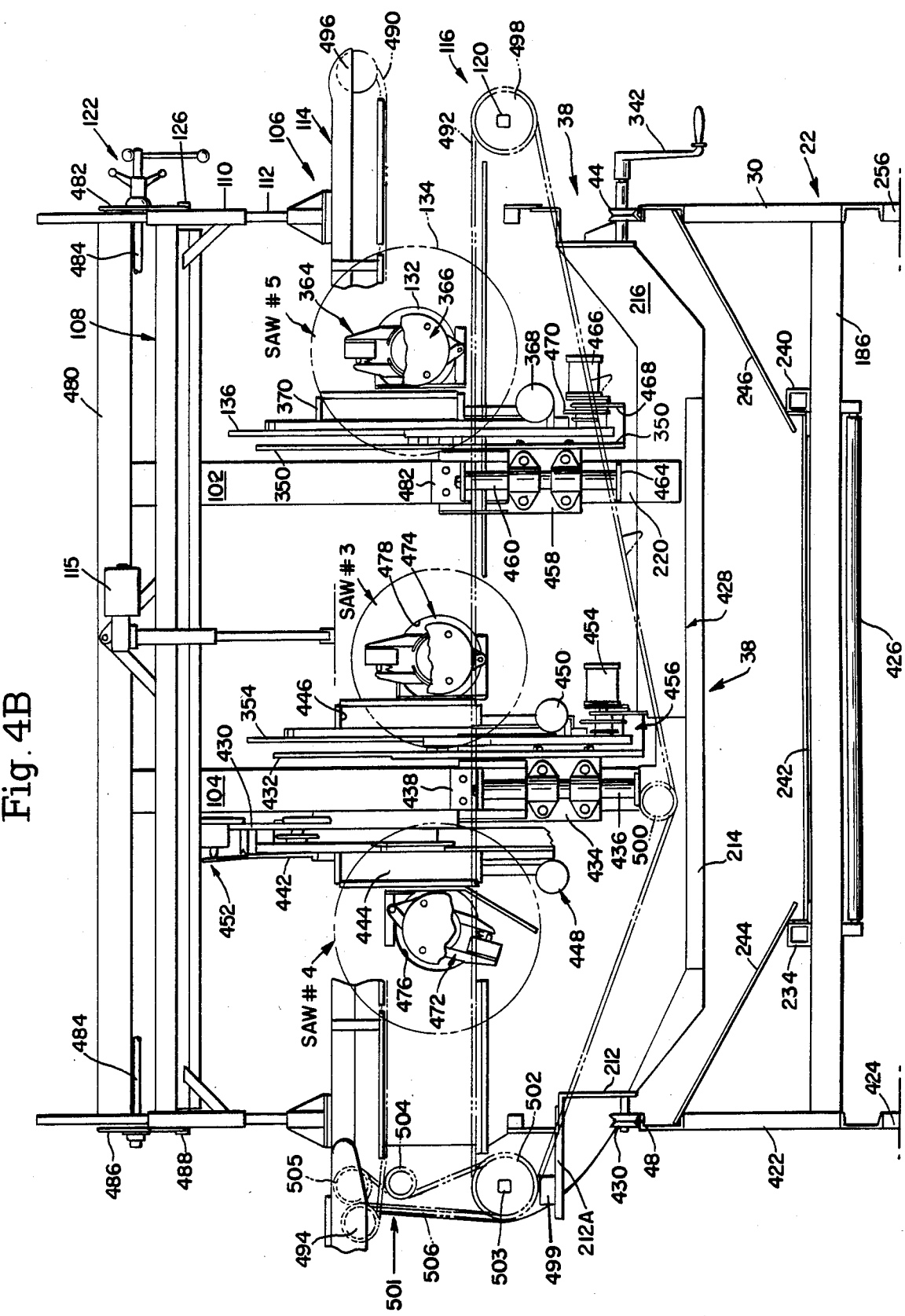
FIG. 4B is a side elevation view of the movable carriage taken on the line 4B—4B of FIG. 1.

The description of the automated truss component saw apparatus of the present invention will be facilitated by the following nomenclature which can be understood by reference to FIGS. 1, 4A and 4B. This nomenclature has been developed for use in the present automated component saw due to the existence of computer programs for the designing of four saw cut components. The stationary frame contains a set of either three saws as shown in FIG. 4A or only two of these saws when a four saw apparatus is desired. When a set of three saws as illustrated in 4A is to be used the saws are numbered from the first saw to come in contact with the lumber lengths to be cut in the apparatus through the last of the three saws as numbers 1, 2A and 2, respectively. In the three saw set shown in FIG. 4A saw No. 2 is a large diameter scarfing blade saw. When a four saw component apparatus is to be constructed saw No.2A is omitted so that each of the remaining two saws are then numbered saws No. 1 and No. 2. Two mounting frames A and B are used in the stationary frame.

On the movable carriage shown in FIG. 4B a similar numbering nomenclature is employed moving in the direction of lumber travel wherein the saws are numbered 5, 3 and 4, respectively. Saw No. 5 is normally referred to as a cutoff saw. When a four saw modification of the present invention is desired saw No. 5 is omitted. In a manner similar to that described above the mounting frame shown in FIG. 4A for mounting saws Nos. 3 and 4 is referred to as frame C and the mounting frame for saw No. 5 is referred to as frame D. In either the four saw modification or the six saw preferred embodiment both mounting frames C and D are employed.

Reference to the mounting frame lettered designations and the saw numbering designations will facilitate the following description.

A preferred embodiment of the six saw apparatus of the present invention is illustrated in FIGS. 1-9 and 12-14. Referring now to FIG. 1 specifically, the automated truss component saw apparatus 20 has a base frame 22 which is constructed of base frame member 24, upright frame members 26, 28, 30 and 32 and a carriage bench frame 34. A stationary mounting frame 36 is mounted on the lefthand side of apparatus 20 and a movable carriage 38 is mounted for horizontal reciprocal movement on the carriage bench 34. The carriage base 40 is provided with wheel sets 42 and 44 which move across a front pitched track 46 and a rear vee-track 48 (shown in FIG. 2B).

A first set of saws illustrated by saw 50 is mounted within the stationary frame 36. Each of the saws in the set have a motor illustrated by motor 52 and a circular saw blade 54 illustrated for saw blade No. 1. The saw motors are preferably mounted on pivotal angulation plates 56 as illustrated for saw No. 1. Each of the angulation plates is mounted for pivotal movement on a mounting plate 58 shown for saw No. 1 in FIG. 3A. The mounting plates are then mounted within the stationary frame and provided with vertical movement with respect to the mounting posts illustrated by post 60 (post A according to the above described nomenclature). A linear actuator assembly 62 is provided for effecting the vertical movement of mounting plate 58.

Also shown in FIG. 1 is a stationary frame hold down conveyor 64 which is formed by a hold down frame 66 horizontally arranged on a head structure 66 supported by mounting post 60 and an extendable arm 68 which has a top hold down shoe assembly 70 affixed to the bottom end thereof. Coacting feed conveyor 72 having an idler gear 71 (FIG. 4A) is arranged for horizontal movement along the carriage frame 34 by means of a track wheel 74. A horizontal support frame 76 is provided for moving the feed conveyor 72 horizontally. The conveyor hold down frame 66 and the horizontal support frame 76 are horizontally adjustable by means of sprocket gear and crank handle assemblies 78 and 80, respectively. Support frame 76 contains a square power shaft 77. Sprocket chain tracks such as track 82 shown on the hold down frame 66 are provided for coaction with the sprocket gears of the assembly 78 and 80.

The extension arm 68 of the hold down conveyor 64 raises and lowers the hold down shoe assembly 70 by means of an electric motor 84 (also shown in FIG. 4A). Operation of the motor 84 causes the extendable member 86 to move vertically by the teeth 88 meshing with a pinion 90 which is connected to a transverse rod 91 (FIG. 4A) which has a similar pinion gear at the rear end for meshing with a rear extendable member 96. This pinion gear and rod construction equalizes the movement of the two extension arms.

As shown in FIG. 4A three circular saws similar to saw No. 1 are mounted on the two mounting posts 60 and 92 which are also identified as post A and B, respectively according to the above nomenclature. The linear actuator 94 driven by the electric motor 84 for raising and lowering hold down shoe assembly 70 is shown centered between the front hold down conveyor arm 68 and a paired rear hold down arm 94. The extension members 86 and 96 support the top hold down shoe assembly 70 of the hold down conveyor 64 through attachment brackets 98 and 100, respectively. A front idler gear 97 and a sprocket chain 99 are movably supported by shoe assembly 70. A support member 101 and a press bar 103 are also shown in FIG. 4A. The hold down shoe assembly will be further described with respect to FIG. 4A.

The movable carriage 38 shown in FIG. 1 also supports two spaced mounting posts illustrated as front post 102 which is also designated as post D. FIG. 4B shows the rear mounting post 104 which is also designated as post C by the above described nomenclature. In a similar manner to the stationary frame 36 a set of three circular saws designated as numbers 4, 3 and 5, are mounted on the two mounting posts C and D as shown in FIG. 4B.

Carriage 38 in FIG. 1 is also provided with a hold down conveyor assembly 106 which has an upper extension frame 108 and an extension arm 110 which has an extendable member 112 for securing a hold down shoe assembly 114 which corresponds to hold down shoe assembly 70 on the hold down conveyor 64. An electric motor 115 identical to the electric motor 84 is provided for the hold down conveyor 106. A lower sprocket chain feed conveyor 116 is mounted for horizontal movement across the frame bench 34 by a pair of wheels illustrated as front wheel 118. An extension frame 120 containing a square power shaft (not shown) is provided for moving the feed conveyor 116 relative to the movable conveyor 38. Sprocket gear and operator handle assemblies 122 and 124 are provided for moving the hold down conveyor and the feed conveyor relative to the movable carriage 38. These assemblies permit simultaneous movement and lock down of the front and rear sides of the conveyor frames through operator shafts (not shown). Sprocket chain tracks illustrated as track 126 for upper extension arm frame 108 are provided on the front and rear of carriage 38 for coaction with the sprocket gears of these assemblies as described with respect to FIG. 4B, below.

As in the hold down conveyor 64 a pinion gear 128 is provided to synchronize movement of the front and rear extension members illustrated as member 112 between vertical adjustments.

The movable carriage set of saws is illustrated by saw 130 in FIG. 1 which is also designated as saw No. 5. As on the stationary side, each of the saws comprise a motor illustrated as motor 132 and a circular saw blade illustrated as blade 134. Each of the three circular saws mounted in the movable carriage 38 is supported for pivotal movement on an angulation plate illustrated as plate 136 for saw No. 5. Each of these plates is, in turn, supported by a vertically movable mounting plate which can be moved vertically by means of a linear actuator shown as 138.

A waste conveyor 140 is arranged within the bottom of the base frame 22 and extends from the conveyor take-up roller 142 mounted on bracket 144 through the length of the base member to the righthand side of the apparatus where the waste from the component cutoff operation is transferred on to an inclined conveyor assembly 146. The drive motor 148 is arranged through gearing to operate the inclined conveyor 146 through powered gears 150 and 152, respectively.

Other features shown in the apparatus of FIG. 1 are a safety line assembly 154 which consists of a spring mounting pulley plate 156 and a perimeter safety cable 158 which is held taut between spring 160 and 161 so that an activator lever 162 can operate a limit switch 164 for closing down operation of the saw apparatus 20 and applying electro-pneumatic actuated brakes to each of the circular saws. The perimeter cable 158 extends around carriage bench 34 so that a take-off helper can shut down the apparatus 20 from the back side as well. Another feature is that a 25 ft. measuring scale 166 is provided along the front surface of the carriage bench 34 and a carriage pointer 168 is provided for determining positions along the carriage bench. Guard housings 170 and 172 are provided for each of the stationary frame and the movable carraige, respectively. Also if desired manually operated handle locks can be provided as part of the crank handle assemblies 78 and 122 for securing the horizontal extension frames 66 and 108 of the hold down conveyors 64 and 106, respectively. In a like fashion knurled knobs 178 and 180 are provided for securing the lower extension frames 76 and 120 against horizontal movement.

A control panel assembly 182 is mounted in a bracket 184 on the lefthand side of the stationary frame 36 and display panel 186 is mounted on the righthand side of the lower carraige guard housings 176.

Figure 3A:
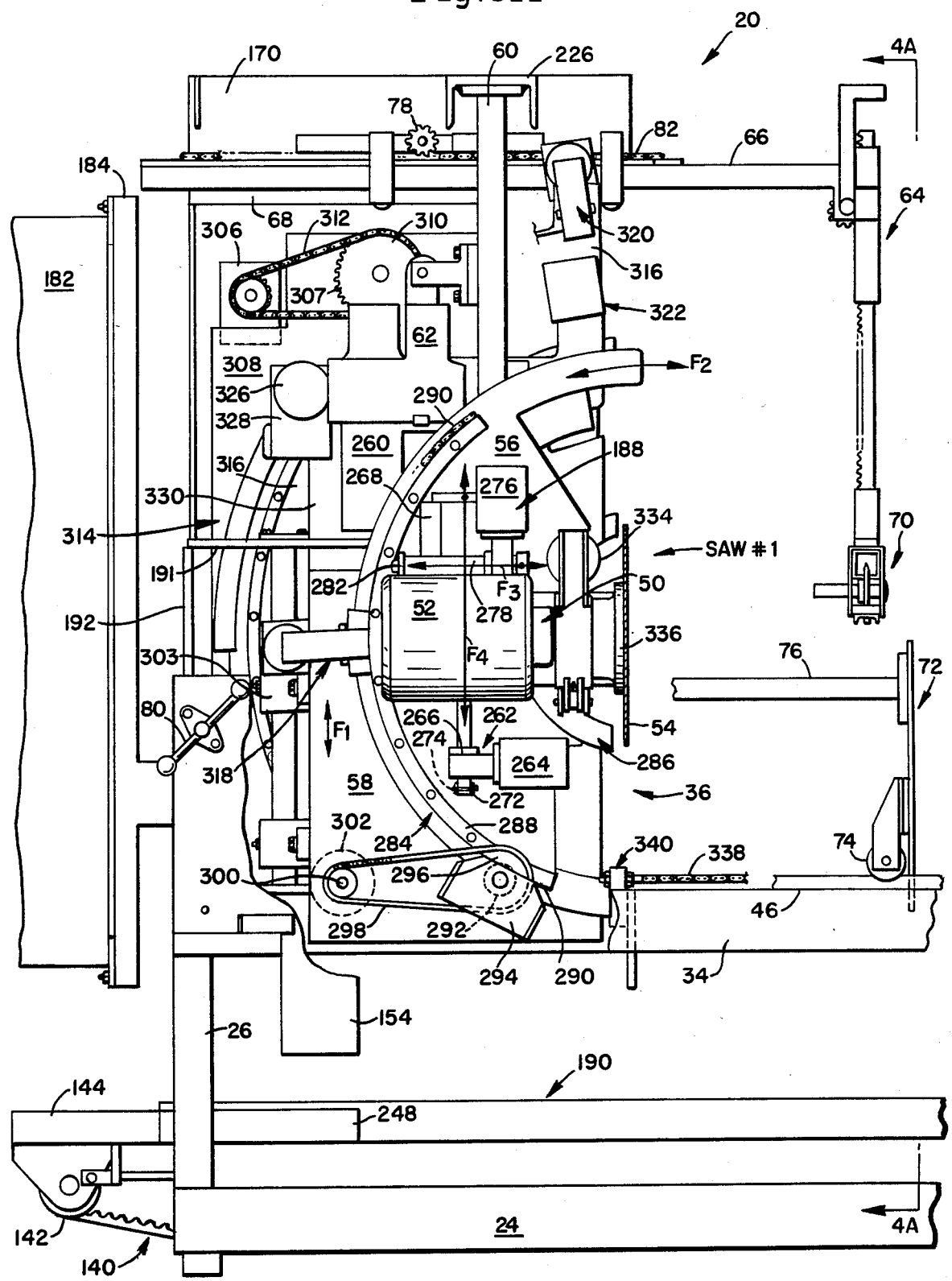
FIG. 3A is a detailed front elevation view of the stationary frame of the present invention showing one of the saw motors mounted on its angulation plate.

As further described with respect to FIGS. 3A an electro-mechanical actuator assembly 188 is provided for effecting the x-axis movement of saw No. 1.

Base Framing

Figure 2A:
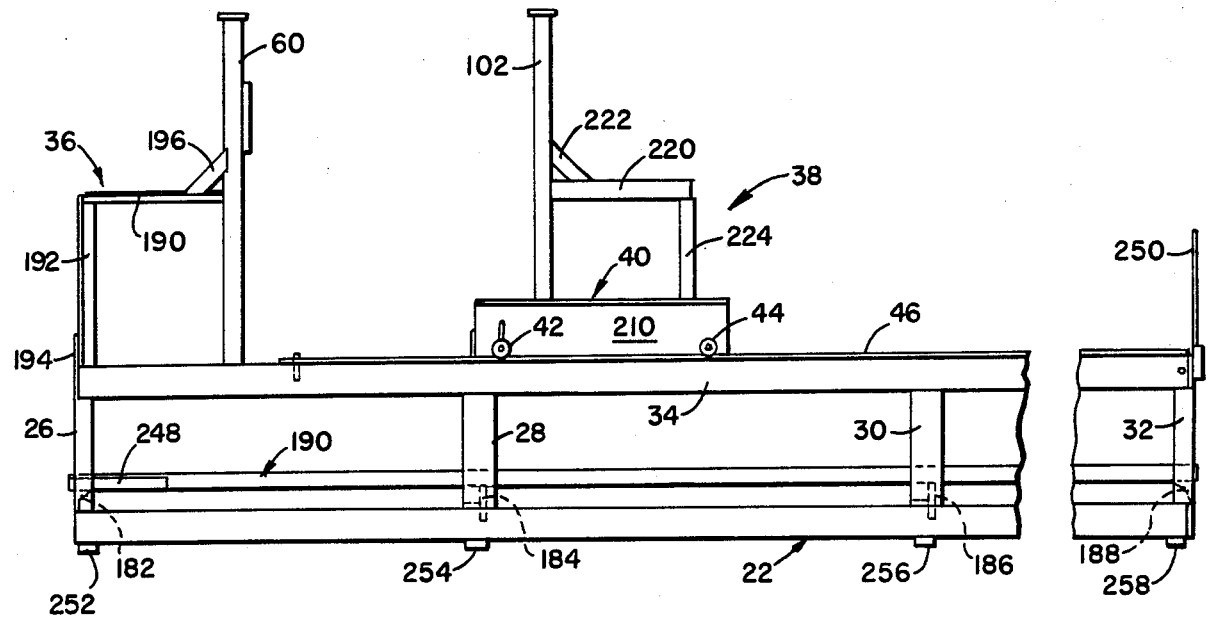
FIG. 2A is a front elevation view of the base frame, one of the stationary mounting frames, and one of the carriage mounting frames positioned on the movable carriage base of the apparatus of FIG. 1.
Figure 2B:
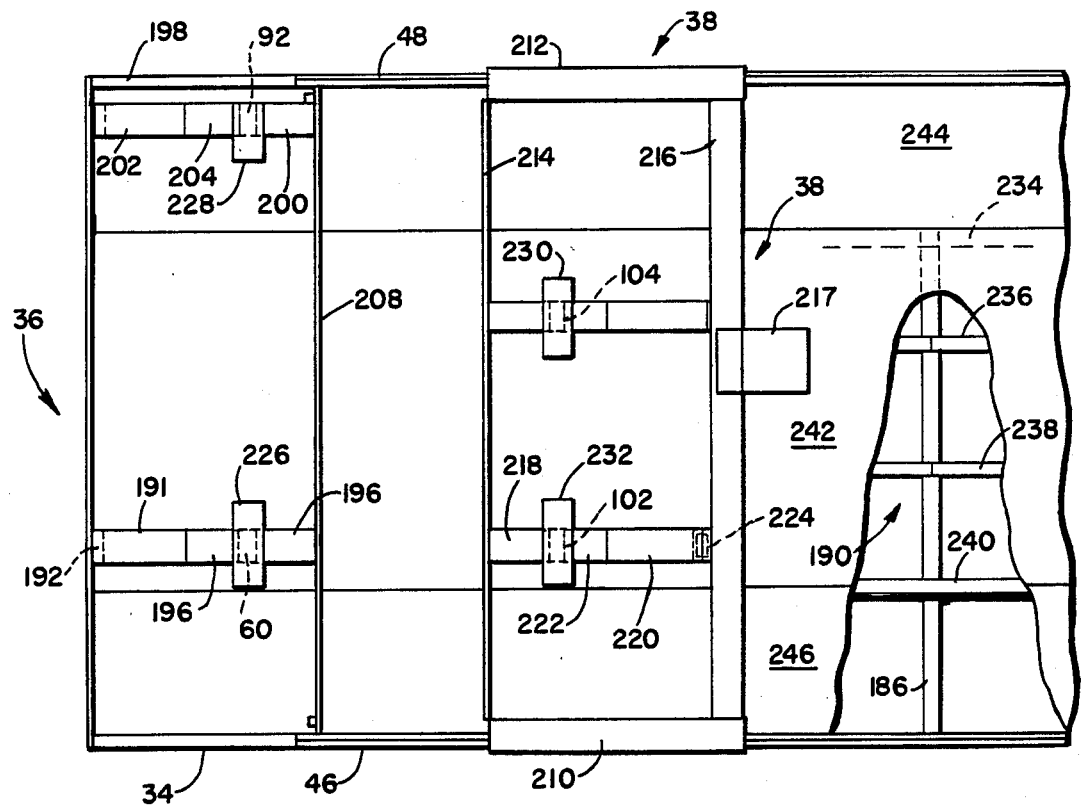
FIG. 2B is a top plan view of the apparatus shown in FIG. 2A.

FIGS. 2A and 2B show the base frame 22, the stationary frame 36 and the movable carriage 38 during a construction phase prior to installation of the operational equipment described with respect to FIG. 1 above. The base frame 122 is constructed with a series of lower frame members 182, 184, 186 and 188 which extend from the vertical posts 26, 28, 30 and 32 across the width of the base frame to a matching set of vertical posts (not shown). A conveyor table 190 is supported on these cross frame members 182-188 for supporting the waste conveyor 140. The stationary frame 36 is shown as constructed with a mounting post 60 reenforced by a horizontal frame member 191 and a vertical frame member 192 which is secured into the to portion 194 of vertical frame member 26. A reenforcing strut 196 is provided between mounting post 60 and the horizontal frame member 191. The mounting post 60 and the vertical frame member 192 are, in turn, secured to a base frame member 196 which is supported by the carriage bench members 34 and 198. Mounting post 92 is similarly supported by carriage bench members 34 and 198 via a base frame 200, a vertical reenforcing frame 202 and a reenforcing strut 204. Parallel frame members 206 and 208 are integrally connected with between the carriage bench members 34 and 198 and form part of the carriage bench.

Movable carriage 38 provides a foundation for mounting posts 102 and 104 as shown in FIG. 2B. This carriage is formed of a carriage base 40 which is constructed of wheel mounting members 210 and 212 and parallel arranged cross connecting frame members 214 and 216. Mounting post 102 is secured to a horizontal frame base 218 and has an upper horizontal frame support member 220 and a reenforcing strut 222 in a similar fashion to mounting post 60. The horizontal frame support member 220 is secured to upright frame member 224. The reenforcing frame members for post 104 are similar. Mounting caps 226, 228, 230 and 232 are positioned on the top of mounting posts 60, 92, 104 and 102, respectively. These posts have been designated as A-D in a clockwise direction as shown in FIG. 2B to coincide with the described numbering of the saws.

Details of the construction of the base frame 22 are also shown in FIGS. 2A and 2B. The table 190 for the waste conveyor 140 consists of a series of frame members 234, 236, 238 and 240 which are arranged perpendicularly to and connect with the base frame members 182, 184, 186 and 188 and also provide support for the hopper-shaped interior of the base frame 22 which has a flat lower panel 242 and upwardly sloped side panels 244 and 246. The base frame 22 then has a hopper-shaped longitudinal internal cross-section which permits the waste from the component manufacturing process to fall downwardly and to accumulate on the waste conveyor 140 which moves on top of the bottom panel 242. The return side of the conveyor hangs downwardly below the cross members 82-88. The lefthand portion of the conveyor table 190 has a cutout portion 248 which coacts with the conveyor mounting bracket 144.

A righthand side power shaft bearing support 250 is also provided on the base frame 22. Support feet 252, 254, 256 and 258 are also provided for maintaining the base frame 22 off of the operating floor.

Stationary Frame Construction

FIG. 3A shows the operation of saw 1 in detail as well as other construction details of the stationary frame 36. As stated above saw No. 1 is provided with a first degree of movement freedom $F_1$ by reason of the vertical movement of mounting plate 58 relative to mounting post 60. This movement is provided by the electro-mechanical actuator 62 which is powered by an electric motor 260. A second movement is provided for saw No. 1 by means of the pivotal movement of the angulation plate 56 as denoted by the double headed arrow $F_2$. This pivotal movement is provided by the mounting of the angulation plate 56 on the mounting plate 58. The third and fourth degrees of movement freedom are provided for saw No. 1 in an x-y coordinate plane represented by the double headed arrows $F_3$ and $F_4$. This coordinate plane is positioned perpendicularly with respect to the pivot axis denoted as P.A. on the saw blade 54. The means of effecting the x-y coordinate axis movement of the saw No. 1 is by an electro-mechanical actuator assembly 188 to effect movement in the x-axis to provide movement $F_3$ and in the y-axis direction via a second electro-mechanical actuator assembly 262. Appropriate motor mounting and slides are provided for effecting this compound movement.

The provision of the x-y coordinate movement for saw No. 1 permits adjustment of the saw blade position while held at a given angular position preestablished by movement of the angulation plate 56 (movement $F_2$). Such coordinate movement then permits the pivot axis P.A. to be moved downwardly by raising the blade position as shown in order to place the pivot axis at a chord position on the circular saw blade 54 so that a larger cutting length is exposed for optimum manufacturing practice. This can be achieved in the component saw apparatus 20 by reason of the compound four degrees of freedom which has been provided for.

The preferred embodiment of the present invention provides the compound four degrees of movement for each of the six saws to thereby cover an extremely large operating envelope for component cutoff angles and types of cuts.

Figure 10:
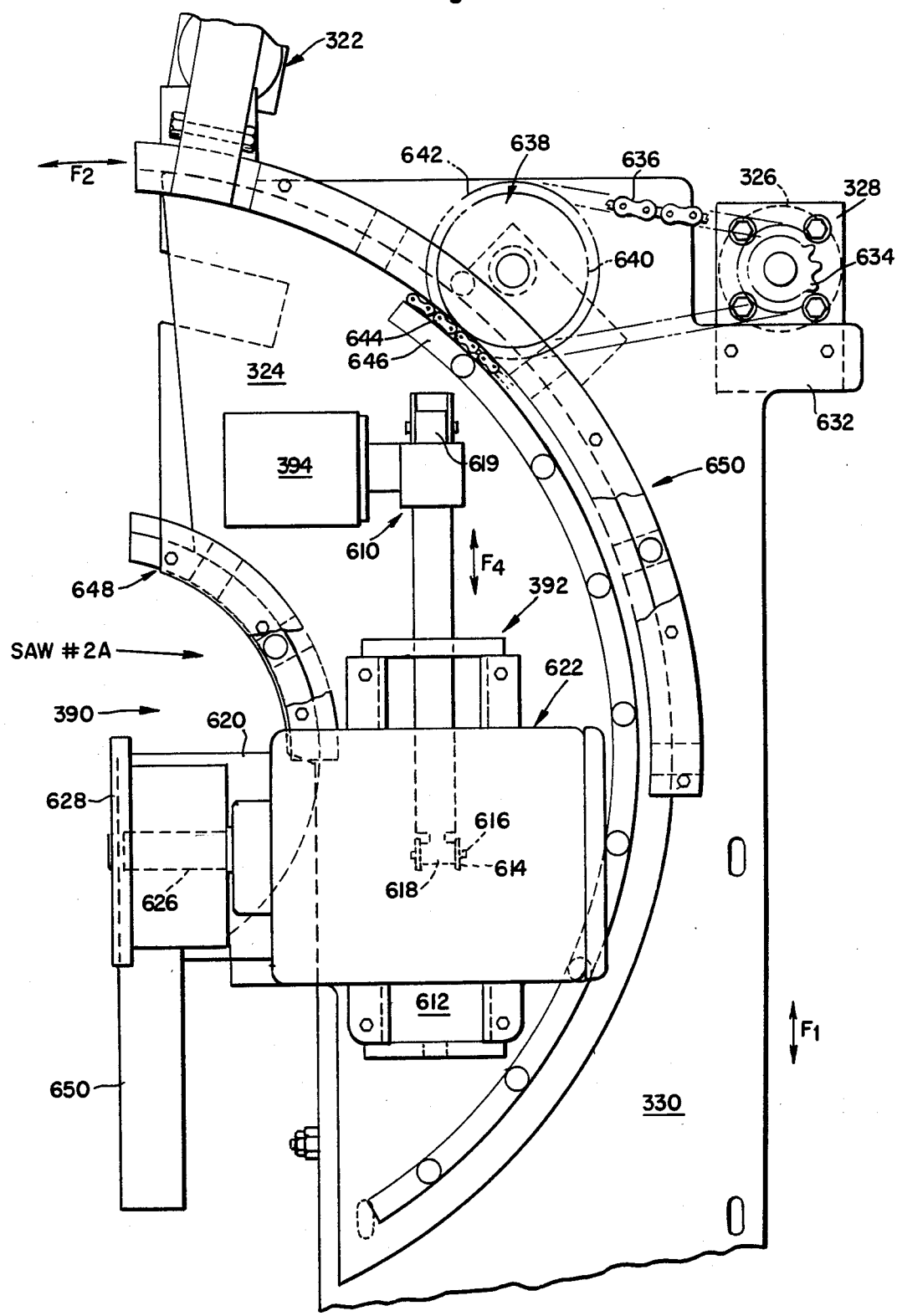
FIG. 10 shows a detailed view of the mounting assemblies and actuators employed for providing a modified movement for one or more of the saws in the present invention.
Figure 11:
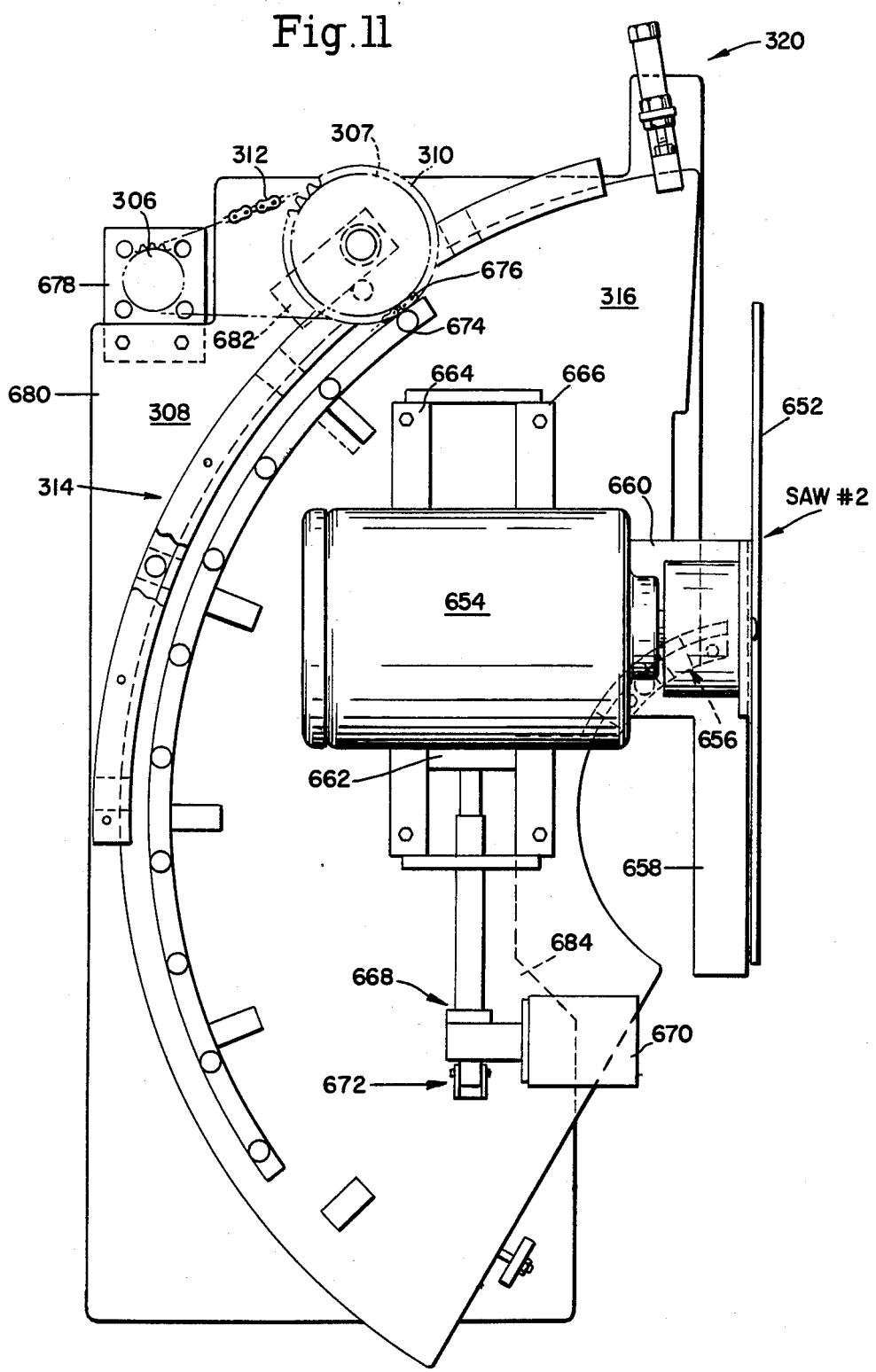
FIG. 11 shows the mounting assembly and actuators employed in a second saw which is mounted by a modification of the present invention.
Figure 16:
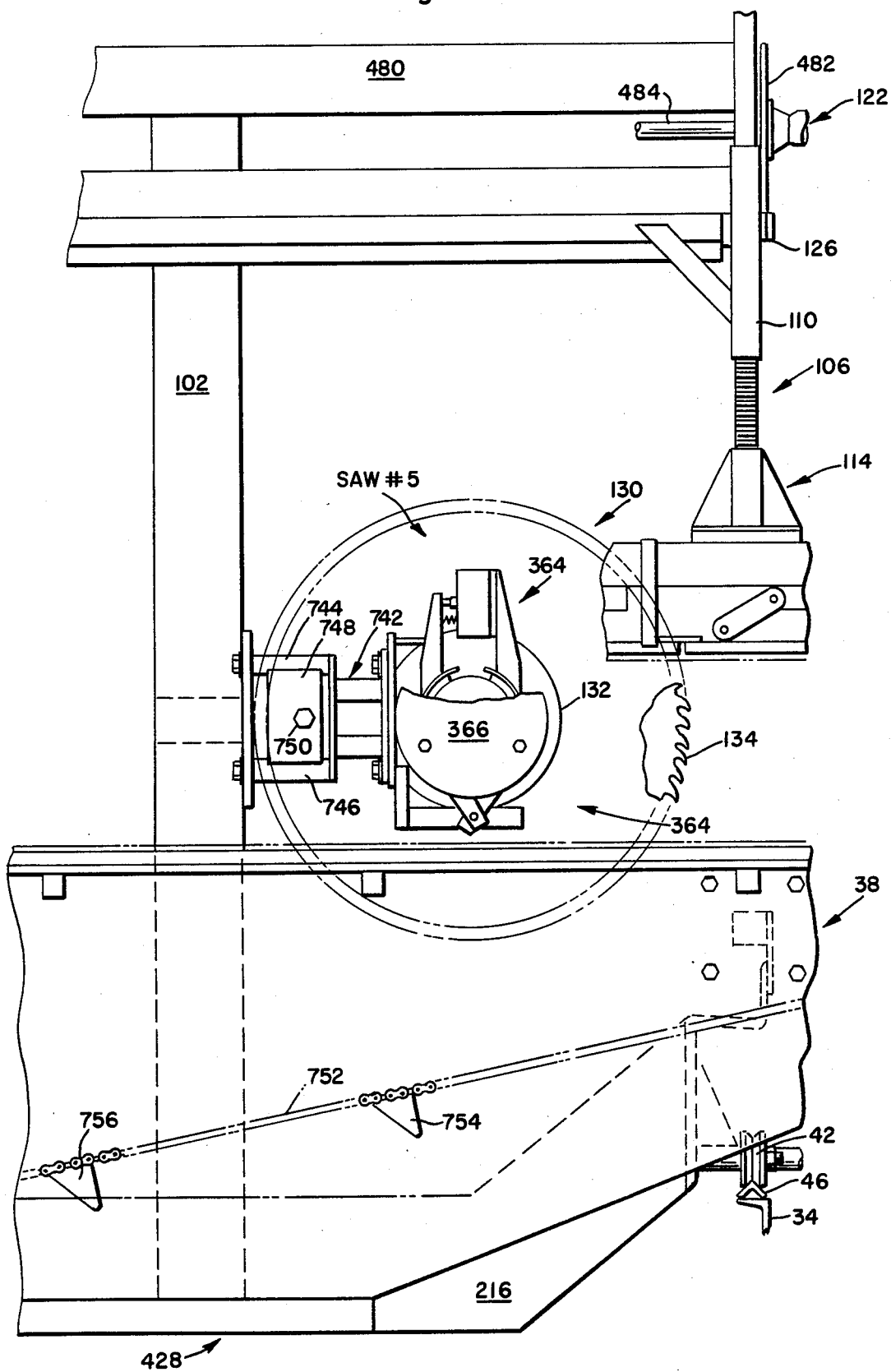
FIG. 16 sows a third modification of a saw motor mounting which can be employed in the present invention.

If desired, one or more of the saws can be mounted for less complex movement of a lower number of degrees of movement freedom for example, a three degree of movement mounting arrangement wherein the y-axis coordinate movement is eliminated can be utilized as illustrated in FIGS. 10 and 11. One or more of the saws can be mounted without a angulation plate whereby only one degree of freedom adjusted either automatically or manually can be employed when only a uniform cutoff is needed. FIG. 16 illustrates such a saw mounting.

The y-axis actuator assembly 262 in FIG. 3A is constructed with an electrical motor 264 and a driven worm gear linear actuator 266 which moves the motor 52 relative to the motor slides 268. The motor is mounted on a flat 270 (best seen in FIG. 17) which is secured on the face of the angulation plate 56. Suitable brackets such as actuator bracket 272 and pivot pins such as pivot pin 274 are provided for connections. The motor 52 is mounted on the slide flat 270 by a cross slide assembly which is operated by the x-axis actuator assembly 188 to provide motion $F_3$ as further described with respect to FIGS. 9 and 17–20 below. The x-y axis actuator assembly 188 has an electric motor 276 and a linear worm gear actuator 278 which is mounted in bracket 280 and drives a follower 282.

The angulation plate 56 is retained on mounting plate 58 by an arcuate outer keeper assembly 284 and by an inner keeper assembly 286. Details of these keeper assemblies are described with respect to FIG. 9. An arcuate chain backup member 288 is spaced from the outer edge of the angulation plate 56 and provides support for a sprocket chain 290 which is arranged along the outer periphery thereof. An angulation chain sprocket gear 292 meshes with the sprocket chain and is supported by mounting bracket 294. A drive gear 296 powers the sprocket gear 292 and is, in turn, driven by a sprocket or roller chain 298 which is powered by a hydraulic motor driven gear 300 which is mounted in a fixed corner position on mounting plate 58 as further described with respect to FIG. 9. Operation of hydraulic motor 302 pivots the saw No. 1 about the pivot axis P.A. by movement in a counterclockwise direction from the position shown in FIGS. 3A. As described further below a 10° clockwise movement is also provided for. This motion then establishes movement $F_2$ as shown by the double headed arcuate arrow. The hydraulic motor 302 can be reversed to return saw blade 54 to the vertical position shown in FIG. 3A.

The vertical sliding movement of mounting plate 58 is provided by a pair of guide slides 303 and 304 which are retained by a rear guide rod 305 which is mounted between horizontal frame member 191 and the base frame member 196. A similar guide and rear arrangement is provided at the front edge of the mounting plate.

As shown in FIGS. 1–9 the saws in the stationary housing set are arranged so that saw No. 1 is pivotable in a counterclockwise directions from the vertical position shbwn while saw No. 2A is pivotable primarily in a clockwise direction so that saw No. 1 makes a first undercut on the lumber lengths moved through the saw apparatus 20 by the conveyor 64 and saw No. 2 makes an overcut on the lefthand end of the lumber length. Saw No. 2 has an enlarged diameter and is referred to as a scarfing saw which makes a long angular cutoff on the top side of the lumber length. Hence, saw No. 2 is pivoted primarily in a clockwise direction by placing the hydraulic motor 306 and the driven gear 307 at the top of the mounting plate 308 for saw No. 2. The sprocket gear 310 which meshes with the angulation plate chain and the driven sprocket chain 312 are also shown in FIG. 3A. The outer keeper assembly 314 for the No. 2 angulation plate 316 is shown in greater detail in FIG. 11.

When the angulation plates have been moved to a desired position they can be clamped at the edge by clamping mechanisms to prevent slight movements out of the desired positions. An air clamp assembly 318 is provided for the first angulation plate 56. A similar air clamping assembly 320 is provided for the third angulation plate 316. The backside of air clamping assembly 322 which holds the position for the second angulation plate 324 can also be seen immediately over the top of the first angulation plate 56.

Also positioned at the same elevation is the hydraulic motor 326 and its motor mounting plate 328 which are attached to the second mounting plate 330 and which will be described in greater detail with respect to FIG. 10.

Safety System

As described with respect to FIG. 1 apparatus 20 has a safety system which permits the shutdown of all of the motors and particularly the saw motors which operate at between 1,700 to 3,500 rpm. This system is controlled by the perimeter safety cable 158 which interrupts power to all of the saw motors and simultaneously applies power to an electronic braking system which consists of electro-pneumatic operated brake shoes contained within braking assemblies illustrated by braking assembly 332 shown for saw No. 1. The pneumatic operated cylinder 334 is attached to this assembly. The saw blade 54 is mountedon a circular support base 336 which is in turn rotated by motor 52.

As shown in FIG. 3A a carriage bench sprocket chain 338 is mounted immediately to the inside of carriage rail 46 and is provided with a tensioning assembly 340. The opposite end of chain 338 is fixed to the carriage bench 34 by a post 341.

Movable Carriage Construction

Figure 3B:
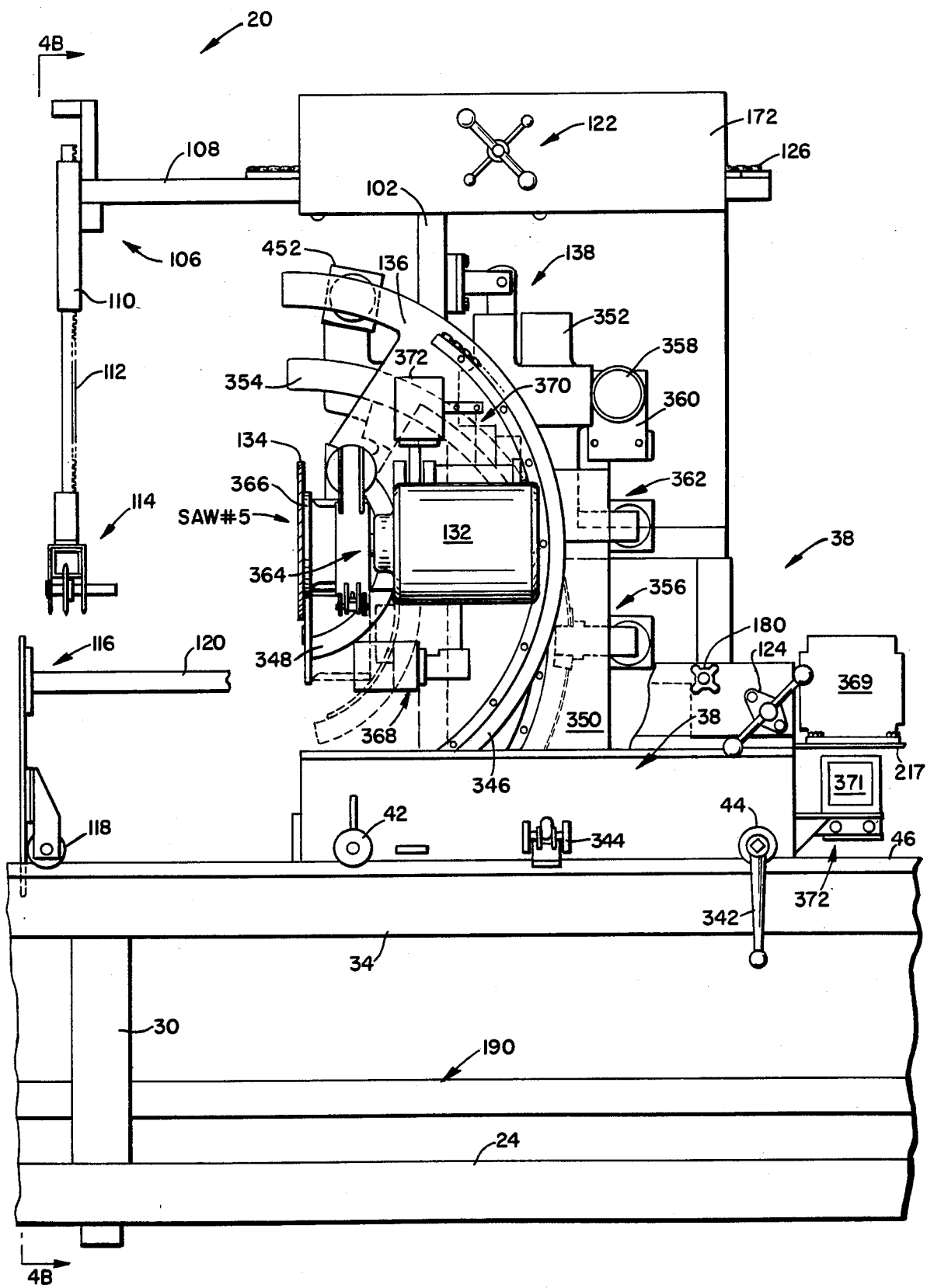
FIG. 3B shows a front elevation view of the movable carriage with one of the saw motors mounted on its angulation plate.

Referring now to FIG. 3B the movable carriage 38 of apparatus 20 is shown mounted on carriage bench 34 and the carriage rail 46 by means of wheels 42 and 44. A hand crahk 342 is provided for meshing a driven gear (not shown) with sprocket chain 338 in order to move carriage 38 with respect to the carriage bench 34. A manually operated carriage lock 344 is provided to lock carriage 38 against rail 46. Also the carriage 38 is power driven from hydraulic unit 371 as described below. A power transmission axle is attached between wheel 44 and a coordinated wheel in the rear for this purpose as described below.

Saw No. 5 is shown in FIG. 3B as constructed with motor 132 which is mounted for x-y coordinate movement on angulation plate 136. An outer keeper assembly 346 and a cooperating inner keeper assembly 348 permit arcuate pivoting movement of angulation plate 136 with respect to mounting plate 350 which is in turn mounted for vertical movement with respect to mounting post 102. The vertical movement is provided by electric actuator assembly 138 which is powered by an electric motor 352. This actuator assembly is affixed to mounting post 102 by a pivotal bracket 354. As shown in FIG. 4B saw numbers 3 and 4 are mounted on rear post 104 while saw No. 5 is mounted on front mounting post 102. The third angulation plate 354 can be seen located behind angulation plate 136 and the air clamping assembly 356 can also be seen for angulation plate 354. The hydraulic motor 358 mounted on bracket 360 is provided for pivotal movement of the fourth angulation plate which is not otherwise viewable in FIG. 3B.

An air clamping assembly 362 is provided for the fifth angulation plate 136. In the same manner as described with respect to saw No. 1 an electro-pneumatic braking assembly 365 is provided for saw No. 5 as is a circular reenforcement mounting 366 which provides support for saw blade 134.

In the same manner as described with respect to saw No. 1 a y-axis linear actuator assembly 388 is provided for moving saw No. 5 along the motor slides 370 and an x-axis linear actuator 372 is provided for moving saw No. 5 perpendicularly with respect to the y-axis movement. The x-y coordinate movement means employed on saw No. 5 is identical with respect to that employed on saw No. 1.

A hydraulic power unit 369 is mounted on bracket 217 for providing power to the conveyors 64, 72, 106 and 116 and the angulation plates in the carriage 38 and to a hydraulic motor on bracket 373 as shown on the righthand of movable carriage 38. This motor 371 provides power to the movable carriage 38. This hydraulic motor can supply power to drive carriage 38 through wheel 44 and its corresponding wheel on track 48.

Modifications In Saw Mountings

As briefly stated above each of the six saws in apparatus 20 can be mounted as described above with respect to saw Nos. 1 and 5 to provide for the full range of four degrees of freedom of movement. For certain employments it is not necessary to provide for the full range of four degrees of freedom for each of the saws. Therefore, various saw mountings can be employed for providing all but one or two of the saws with three degrees of freedom movement capability. FIGS. 4A and 4B illustrate such saw mountings in apparatus 20 for all of the saws except saw No. 1. In saws Nos. 2-5 as shown in FIGS. 4A and 4B three degrees of freedom are provided by elimination of the x-axis actuator assemblies such as 188 and the associated cross slide assemblies, shown for saw No. 1. It is understood that apparatus 20 as described in FIGS. 1-9 and 12-14 can be outfitted with four or five of the six saws mounted for only three degrees of freedom rather than the full four degrees of freedom as disclosed elsewhere herein. A present commercially preferred embodiment is to provide saw Nos. 1 and 4 as numbered above with four degrees of freedom, saw Nos. 2, 2A and 3 with three degrees and saw No. 5 with one degree of freedom of movement.

Stationary Frame Layout

FIG. 4A shows a linear potentiometer assembly 374 which is connected by a ribbed timing belt 376 to hydraulic motor 302 which powers the pivoting of angulation plate 56. Rotation of the shaft of hydraulic motor 302 is transmitted via belt 376 to a driven sheave 378 which causes a position transducer 380 to register varying voltages depending upon the number of revolutions transmitted. The output from transducer or linear potentiometer 380 is then utilized as an electrical input to the control system 382 as further described in FIG. 13. This direct drive potentiometer recording capability permits the exact position of angulation plate 56 to be indicated at all times within the control system 382. Similar linear potentiometers can be utilized for recording the revolutions of the hydraulic motors utilized for recording the revolutions of the hydraulic motors utilized throughout apparatus 20 in order to precisely record the position of the associated mechanical components driven by each of the hydraulic motors. In this manner precise positional information can be generated for all degrees of freedom for which each of the saws are provided.

FIG. 4A also shows the conveyor takeup roller 142 and a bottom guide roller 348 which prevents the returning conveyor belt 140 from dragging on the shop floor.

Electric motor 386 and a rear hydraulic power unit 388 are also mounted in base frame 22. The motor 386 operates the scrap conveyor 140 while unit 388 powers the hydraulic motors which provide motive means for the angulation plates in the stationary frame.

The relationship of saw No. 2A (390) with respect to saw No. 1 can be seen in FIG. 4A. The saw is mounted on an y-axis motor slide assembly 392 which is driven by an electric motor and linear actuator assembly 394 relative to the angulation plate 324 which is in turn pivotally supported on the second mounting plate 330. An electro-pneumatic brake assembly 393 can also be provided. Both of the first and second mounting plates 58 and 330 are mounted to a rod guide 400 which is reciprocal along front guide rod 402 which is in turn mounted to front guide rod retainer 404 in a similar manner to the rear guide rod 305 described with respect to FIG. 3A above. The front guide rod retainer 404 is in turn bolted to the mounting post 60. The linear actuator assembly 62 described with respect to FIG. 3A is mounted on the top rear side of mounting posts 60 and is utilized to raise and lower the two mounting plates 58 and 330 simultaneously. Also shown for this saw number 2A is an air cylinder lock 322 which can be seen at the top of the angulation plate 330 in this FIG. 4A.

Saw No. 2. (405) is similarly mounted for y-axis movement with respect to its angulation plate 316 by a motor slide assembly 406 which is powered by a hydraulic motor and linear actuator assembly 408. The mounting plate 308 for saw No. 2 is also adjustable vertically along post B (92) by means of a linear actuator positioned behind post B which is similar to linear actuator 62 mounted in the same position behind post A. A front rod guide 410 is provided for stabilizing vertical movement along the front guide rod 412 which is secured by a guide rod retainer bracket 414 and a guide rod base 416 which is fixed to frame 200. A similar rear guide rod and guide assembly is provided behind post B in a similar manner with respect to that described for FIG. 3A, with respect to saw No. 1. Also in FIG. 4A the inner angulation plate keeper assembly 418 can be seen. As for saw No. 2 an electro-pneumatic brake assembly 419 can be provided.

The top frame 420 is also seen attached to post cap 226.

Movable Carriage Layout

Turning now to FIG. 4B base frame 22 has a rear vertical frame member 422 which corresponds to front frame member 30. It is connected to cross frame member 186 as shown in FIG. 2B. A rear footing 424 is provided for matching the leveling provided by front foot 256. A second conveyor belt return roll 426 is mounted on the bottom of cross frame 186. Movable carriage 38 is constructed from a trough-shaped frame assembly 428 which has frame member 214 at the lefthand side as shown in FIG. 2B and frame member 216 at the righthand side. A carriage wheel 430 is provided for moving along conveyor track 48 to match the movement of wheel 44.

Saw Nos. 4 and 3 are mounted for vertical movement with respect to post C (104) by means of a hydraulic motor and linear actuator assembly (not shown) which is mounted on the reverse side of post C as shown in FIG. 3B. The two mounting plates 430 and 432 are also connected to the front rod guide 434 which slides along the front guide rod 436 and is in turn mounted on the front side of post 104 by a guide rod retainer 438 and at the lower end by a guide rod base 440. The number 4 angulation plate 442 and the number 3 angulation plate 354 are pivotally mounted on the outer faces of their respective mounting plates 430 and 432 by inner and outer keeper assemblies similar to those described for saw No. 1. Each of the saw Nos. 4 and 3 are mounted on to the outside surfaces of the angulation plates by motor slide asemblies 444 and 446, respectively, which are operated by an electric motor and linear actuator assemblies 448 and 450, respectively. An air cylinder lock 452 is provided for the number angulation plate. The hydraulic motor 454 for providing pivotal movement of angulation plate 354 is secured to the mounting plate 432 and is connected to a drive gear assembly 456.

Saw No. 5 is mounted in a similar fashion by reason of the motor slide assembly 370 which is affixed to the outer surface of angulation plate 136 and which is, in turn, mounted for pivotal movement on mounting plate 350. This mounting plate 350 is provided with vertical movement relative to mounting post 102 by means of the electric motor and linear actuator assembly 138 which is mounted behind post 102 as shown in FIG. 3B. Movement of the mounting plate 350 relative to post 102 is provided by the attachment of mounting plate 350 to the front rod guide 458 which slides along front guide rod 460 which is in turn secured to mounting post 102 by upper retainer bracket 462 and the lower positioned guide rod base 464.

The hydraulic motor 466 is mounted on mounting plate 136 and powers the drive gear assembly 470 supported on bracket 468 for operating the angulation plate 136 with respect to mounting plate 350. As described with respect to saws Nos. 1, 2A and 2, electro-pneumatic operated braking assemblies 472 and 474 are provided for saws 4 and 3. Braking assembly 346 has been earlier described with respect to saw No. 5. Motors 476 and 478 are of course provided for driving saws Nos. 4 and 3.

Top cross frame member 480 is shown attached at the top ends of mounting post 102 and 104. The operation of the hold-down frame 108 by means of operator handles 122 is shown in FIG. 4B wherein the sprocket gear 482 is arranged for meshing with sprocket chain 126 described with respect to FIG. 1 and a transmission rod 484 is mounted in the hold down frame 108 in order to provide for transmission of manual rotational control to a rear sprocket gear 486 which in turn meshes with an oppositely positioned sprocket chain 488. The remainder of the hold down conveyor 106 is shown having an upper driven sprocket chain 490 and a lower driven chain 492 positioned by a series of sprocket gears 494, 496, 498, 500 and 502, which are conventional. A mechanical drive unit 501 operates through drive gears 504, 505 a gear 502A located in the plane of unit 501 behind gear 502, and a drive chain 506 for supplying power to both of the upper and lower conveyor chains at the rear portion of apparatus 20. The hold down conveyor 64 is powered by a telescoping torque rod which is connected by universal joints to the drive unit 501 and then to the sprocket gear 494 (FIG. 4B). This permits vertical and horizontal adjustment of the hold down conveyor 106. A similar mechanical drive unit is employed for the conveyor systems 64 and 72 shown in FIG. 4A. Thus a telescoping torque rod is connected through universal joints to hold down conveyor gear 507 in FIG. 4A from the drive unit on the stationary frame 36 corresponding to unit 501.

The conventional drive system for the hold down conveyors 64 and 106 and the feed conveyors 72 and 116 involves the use of hydraulic power unit 369 (FIG. 3B) attached to the movable carriage 38 to operate hydraulic motor 499 which powers the drive unit 501. Both motor 499 and drive unit 501 are positioned on the rear lefthand corner of the carriage 38 as seen in FIG. 4B. Drive unit 501, then powers both the upper sprocket gear 494 of conveyor 106 and the lower sprocket gear 502 of feed conveyor 116 in FIG. 4B.

Motor 499 is supported by a frame bracket 212A.

The drive power is then transferred from the driven gear 502 via a sliding square rod 503 to a driven sprocket gear 509 which powers the stationary frame feed conveyor 72 (FIG. 4A). The mechanical drive unit for the stationary frame 36 (not shown) which is similar to drive unit 501 then distributes the drive power to the stationary side hold down conveyor 64. In this manner the conveyor system power is provided from the movable carriage simultaneously to both the hold down conveyor 106 and the feed conveyor 116 of that carriage 38 and to the matching conveyors on the stationary frame 36. The square slip rod 503 assures the same conveyor chain velocity on both sides.

The separation of the hydraulic power inputs to the stationary frame via unit 388 mounted in base frame 22 and to the movable carriage via unit 369 offers the advantage that the stringing of hydraulic lines is greatly simplified. Unit 369 is also used to power the conveyors and the movable carriage. The transmission of mechanical power from the carriage to the stationary frame through a single square telescoping rod for powering the conveyors on the stationary frame is also highly advantageous.

Variations In Freedom Of Movement

Schematic diagrams FIGS. 5A and 5B show the stationary frame 36, the movable carriage 38 in views similar to FIGS. 4A and 4B with saw Nos. 1–5 mounted therein as described above. If desired, each of the six saws can be mounted for having the full four degrees of movement as illustrated in FIGS. 5A and 5B. The movements provided are best understood by reference to the mounting posts such as post 60 in FIG. 5A. A first degree of freedom is provided by the vertical movement $F_1$ which is accomplished by movement of the mounting plates for saw Nos. 1 and 2A with respect to post 60. The second degree of freedom $F_2$ is provided by pivoting of the angulation plates for each of the saw Nos. 1 and 2A. The x-y coordinate movement on the face of the angulation plates is denoted as movements $F_3$ and $F_4$, respectively, wherein the $F_3$ movement is denoted by an end view of two arrows pointed in opposite directions perpendicular with the plane of the figure. As shown in FIG. 4A the x-axis movement can be selectively eliminated as was done for saw Nos. 2A and 2.

Referring now to FIG. 5B, saw Nos. 3, 4 and 5 can be similarly mounted for each to have four degrees of freedom. If desired the x-axis movement on the surface of the angulation plate can be eliminated whereby the $F_3$ movement capability is removed from one or more of these saws as was done for the saws illustrated in FIG. 4B. If it is determined that a y-axis motion is not required, then the $F_4$ motion can be eliminated as well and this is sometimes done for the cutoff saw No. 5 by providing it with a simple manual x-axis movement which is the only degree of freedom as shown in FIG. 16.

Thus the degrees of freedom for any one of the six component saws can be varied from one to four degrees. An expected preferred modification is to mount all six of the saws with four degrees of movement. For certain present commercial applications only two of the six saws are mounted for the full four degrees of freedom with the remaining four saws mounted for three or less degrees of freedom.

Another feature of the present invention is that each of the degrees of freedom provided for saws 1-5 can be automatically controlled by means of an automatic positioning mechanism which provides for the setting of a predetermined position into the mechanism and then causing the automatic positioning system included within the mechanism to seek out the predetermined position through the use of a feedback control loop subsystem. This automated saw positioning mechanism achieves fast setup and adjustment for each of the saws 1-5 so that multiple component runs for a given job order can be efficiently produced on the apparatus 20 at high productivity rates and with low inventory buildup.

Mounting Frame Details

FIGS. 6-9 show a construction sequence for the mounting of saw No. 1.

Figure 6:
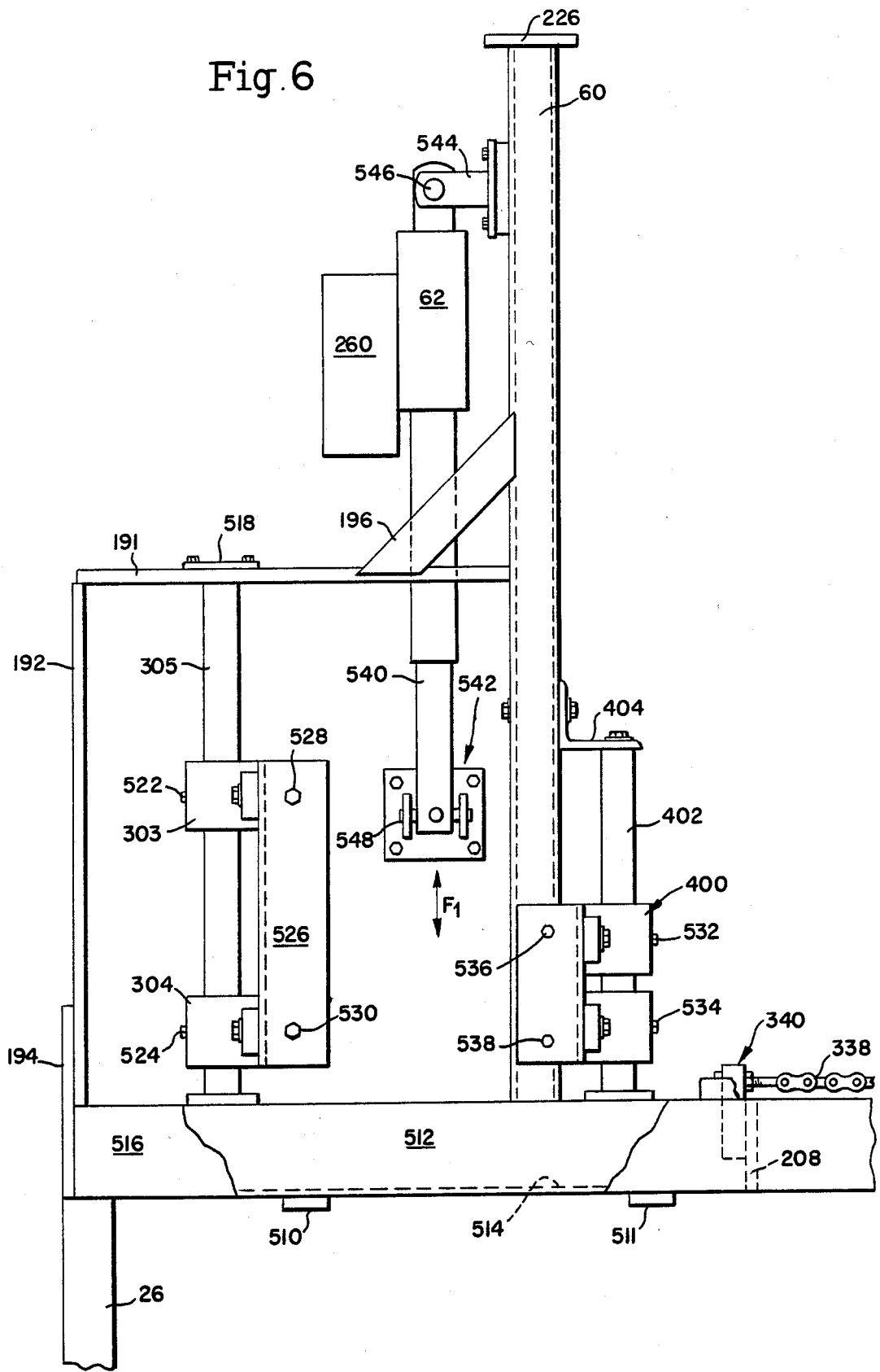
FIG. 6 shows a cut away view of the stationary frame which illustrates the linear actuator utilized for providing a first vertical movement for the saw mounting plate.

As shown in FIG. 6 mounting post A (60) is shown supported perpendicularly with respect to the carriage bench 34. As seen in FIG. 2B this post is supported by transverse frame member 196. Reenforcement frame members 510 and 511 are shown on the underside of the carriage bench 34 which is constructed of a channel frame member 512 having a inwardly directed flange 514 and an outer facing panel 516 which can extend to partially cover the elements shown in FIG. 6 as is shown in the FIG. 1 general view. The rear guide rod 305 is shown bolted to frame member 191 by a bracket 518 at the top and a guide rod base 520 which is secured to the base frame member 196 (FIG. 2B). The rod guide slides 303 and 304 are provided with grease fittings 522 and 524 to provide lubrication for the reciprocal movement of mounting plate 58 which is attached to the rod guide 526 via the bolt holes 528 and 530. The front guide rod 402 is shown with the rod guide assembly 400 mounted thereon for reciprocal movement and provided with grease fittings 532 and 534. Attachment of the front edge of mounting plate 58 to the rod guide assembly 400 is via the bolt holes 536 and 538.

Linear actuator 62 operates an extendable member 540 which is attached to a dual bracket 542 which is shown with only one bracket base in FIG. 6 which is connected to the number 2A mounting plate 330 as shown in FIG. 4A. An opposing bracket base is also connected to extendable member 540 for attachment to the backside of mounting plate 58 (shown in FIG. 7). Operation of linear actuator 62 by electric motor 260 then permits raising and lowering of the number 1 and 2A mounting plates 56 and 330 simultaneously. An upper mounting bracket 544 is provided at the top end of mounting post 60 for retaining the linear actuator. Pivot pins 546 and 548 transmit power from the linear actuator to the post 60 and the mounting bracket 542.

Figure 7:
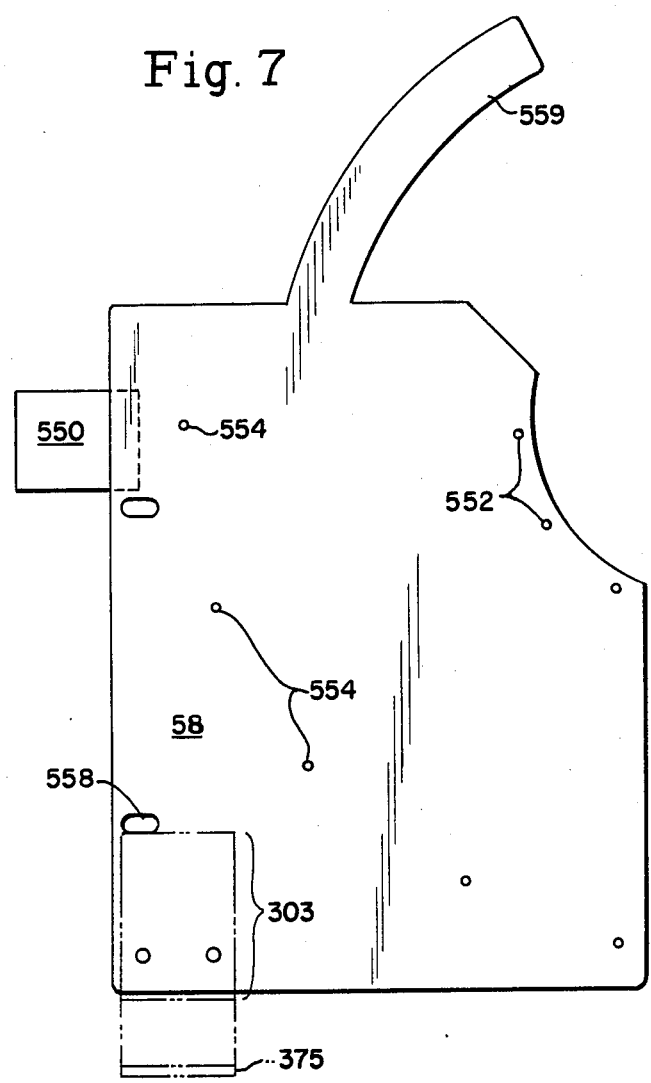
FIG. 7 shows a detailed view of the mounting plate for one of the saws in the stationary frame.

Mounting plate 58 shown in FIG. 7 has the angulation motor mounting bracket 303 mounted in the lower rear corner as installed in apparatus 20 and is shown in FIG. 3A. The transducer bracket 375 is also shown in this same position, but at a slightly lower level as shown in FIG. 4A. A mounting bracket 550 for attachment of the air cylinder clamp 318 is also shown. A first arcuate series of bolt holes 552 are provided for attachment of the inner keeper assembly 286 which functions to provide for the pivotal movement of angulation plate 56 with respect to mounting plate 58. A second set of arcuately arranged bolt holes is also provided in mounting plate 58 for attachment of the outer keeper assembly 284. Adjustment slots 556 and 558 are provided for attachment of the mounting plate 58 to the rear rod guide 526. An arcuate scale support arm 559 is integral with the top edge of the mounting plate 58. An angular scale can be mounted on this arm to provide for sight indications of angular positions.

Figure 8:
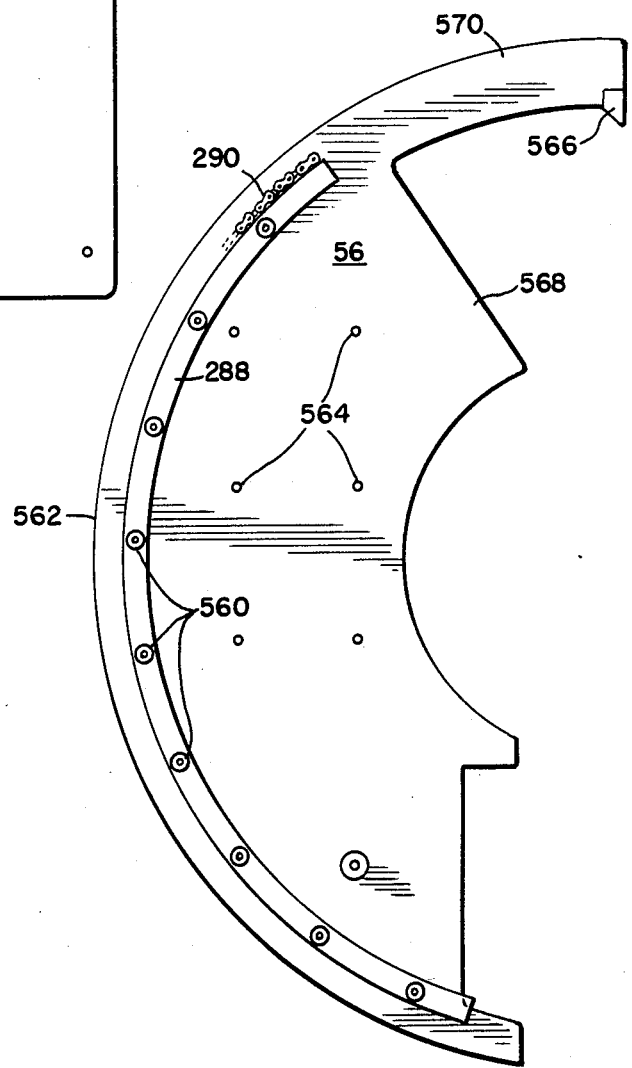
FIG. 8 shows a detailed view of the angulation plate for one of the saws mounted in the stationary frame.

FIG. 8 then shows the angulation plate 56 which is installed on the outer surface of mounting plate 58 and is spaced therefrom by the width of the lower part of the inner and outer keeper assemblies 286 and 284, respectively. The chain backup member 288 is shown secured by a number of flatheaded construction screws 560 to a position adjacent the outer arcuate edge 562 of the angulation plate 56. A series of six bolt holes are provided for attachment of the y-axis motor slides 268 to the face of the angulation plate.

The cutback portion 568 is utilized to provide clearance for the ends of the lumber lengths brought through apparatus 20 by the conveyor 64. The extension portion 570 is provided to allow the maximum bearing support for the outer keeper assembly 284 and also to provide a clamping surface for air cylinder lock 318 when angulation plate 56 has been pivoted to its full counterclockwise position. A pointer 566 for indicating angular positions of the angulation plate 56 relative to the associated scale mounted on support arm 559 is also attached to portion 570.

Figure 9:
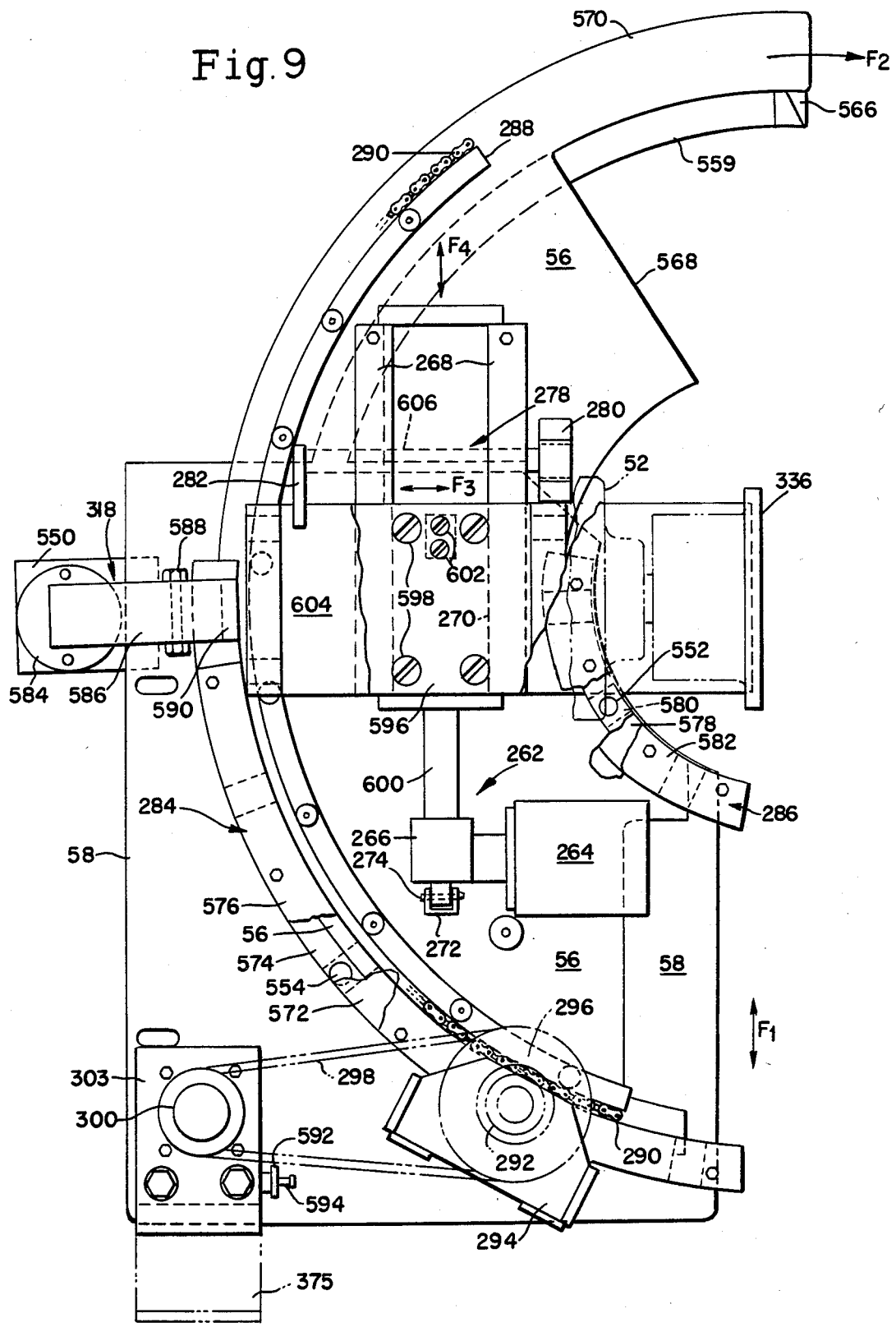
FIG. 9 is a detailed view of the mounting assembly and linear actuators employed for providing the x-y coordinate movement for one of the saws mounted in the stationary frame.

As shown in FIG. 9 angulation plate 56 is installed on mounting plate 58 by means of an outer and an inner keeper assemblies 284 and 286, respectively. Both of these keeper assemblies are constructed of three arcuate shaped members, a base keeper member 572 is provided for contacting the surface of mounting plate 58 and is secured thereon by bolts through the bolt holes 554 shown in FIG. 7. Next the angulation guide ring outer spacer 574 is installed and secured by bolts into the same arcuate arranged bolt holes. Then the top arcuate keeper member 576 is installed over the guide ring outer spacer 574, again utilizing the same arcuate arranged bolt holes 554. The angulation plate 56 then slides against the guide ring outer spacer 574 and is retained between the inner lips of the arcuate members 572 and 576. A similar construction is employed for the inner keeper assembly 286 which is composed of an arcuate base member 578 and angulation guide ring inner spacer 580 and a top arcuate member 582. These members of the inner keeper assembly 286 are secured to mounting plate 58 through the arcuate arranged bolt holes 552 shown in FIG. 7.

The air cylinder clamp assembly 318 is shown mounted on bracket 550 and consists of an air cylinder 584 which operates the angulation plate lock 586 which pivots about the lock shaft 588 to engage the edge of the angulation plate 56 at lip position 590. The pivotal action of the angulation plate locks is employed for all of the air cylinder locks on apparatus 20. The lock shaft 588 is secured in a bracket connected to the mounting plate 58 and a backup pedestal is also provided.

A tightener block and flat 592 can be provided for adjusting the tension in sprocket chain 298 by moving the bracket 303 relative to plate 58. This is accomplished by turning a set screw 594.

Another detail shown in FIG. 9 is the x-axis movement slide flat 596 which is secured to the slide flat 270 by a series of four bolt holes 598. The slide flat 270 provides the movement $F_4$ as explained with respect to FIG. 17. The linear actuator rod 600 is connected to these slide flats via bolt holes 602. The mounting plate 604 for motor 52 is then secured to the slide flat 270 by a shaft guide and sleeve assembly 605 as further described with respect to FIGS. 17-20. The x-axis actuator follower 282 is moved by the slide guide shaft 606. The slot 608 provided between the x-axis actuator bracket 280 and the actuator assembly 278 permits the assembly of follower 282 on to the end of this actuator 278 and such spacing also provides a safety function as further described in reference to FIG. 18. The scale support arm 559 and pointer 566 are also shown at the base 0° position in FIG. 9.

Mounting For Saw Nos. 2A and 2

FIGS. 10 and 11 show the mounting for saw Nos. 2A and 2, respectively, as shown by the section lines 10—10 and 11—11 in FIG. 4A. As previously described with respect to FIG. 4A saw Nos. 2A and 2 are shown mounted without an x-axis coordinate capability. The hydraulic motor 394 is mounted on angulation plate 324 to provide for linear movement of the actuator and worm gear assembly 610 which is connected to slide flat 612 by a actuator bracket 614 and a pivot pin 616. A connecting member 618 is also provided as is a bracket and pin set 619 on the opposite end of the worm gear assembly. The slide flat 612 is in turn connected to the motor mounting plate 620 which is perpendicularly affixed thereto. The motor 622 is then secured to the motor mounting plate. The motor output shaft 626 is attached to a motor hub 628. A deflector 650 is also attached to mounting plate 620 to assure that cutoff ends will be deflected downward in the base 22. Saw No. 2A in this FIG. 10 is shown withou the electro-pneumatic braking mechanism 393 such as shown in FIG. 4A.

The hydraulic drive motor 326 and its mounting plate 328 are shown mounted on extension 632 on the rear edge of mounting plate 330. The driven sprocket gear 634 transmits power through sprocket chain 636 to the powered angulation sprocket gear pair 638 which consists of a first gear 640 for meshing with chain 636.and a second gear 642 which meshes with the angulation chain 644 which is in turn secured in position by the chain backup arcuate member 646 in a similar fashion to that described with respect to the first angulation plate. The angulation plate 324 is mounted on the mounting plate 330 between the arcuate shaped inner keeper assembly 648 and the outer keeper assembly 650 both of which are similar in construction to that described with respect to saw No. 1. The air cylinder lock 322 is identical with air cylinder lock 318 described with respect to FIG. 9.

FIG. 11 shows details of the enlarged third angulation plate 316 and its associated mounting plate 308. This angulation plate 316 provides for angular adjustment for the enlarged diameter saw blade 652 which is powered by motor 654. The angulation plate 316 is mounted for pivotal movement with respect to mounting plate 308 by an inner angulation plate keeper assembly 656 and an outer keeper assembly 314 (also seen in FIG. 3A). The angulation plate keeper assemblies provide for pivotal movement in the same manner as the keeper assemblies for the first and second angulation plates 56 and 324. A deflector 658 is provided off of motor mounting plate 660 for deflecting cutoff ends downwardly. Motor mounting plate 660 is affixed in a perpendicular relationship with respect to the slide flat 662 which reciprocates between the motor slides 664 and 666 by means of linear actuator 668 which is in turn powered by electric motor 670 A mounting bracket and pin set 672 is also provided similar to the actuator bracket and pivot pin 619 shown in FIG. 10.

The chain backup member 674 and the angulation chain 676 are provided for meshing with the sprocket gear 310 which is in turn powered by gear 307 through sprocket chain 312. A mounting bracket 678 is connected to an extension portion 680 at the rear of mounting plate 308. An air cylinder brake 320 is provided at the top of the angulation plate 316. Also an angulation sprocket mounting plate 682 is provided for a mounting for the powered angulation sprocket gear 307 and the drive gear 310.

A recessed portion 684 is provided on the front portion of mounting plate 308 in order to provide clearance for the saw blade 652 when it is pivoted into a nearly horizontal attitude.

Position Transducers

Figure 12:
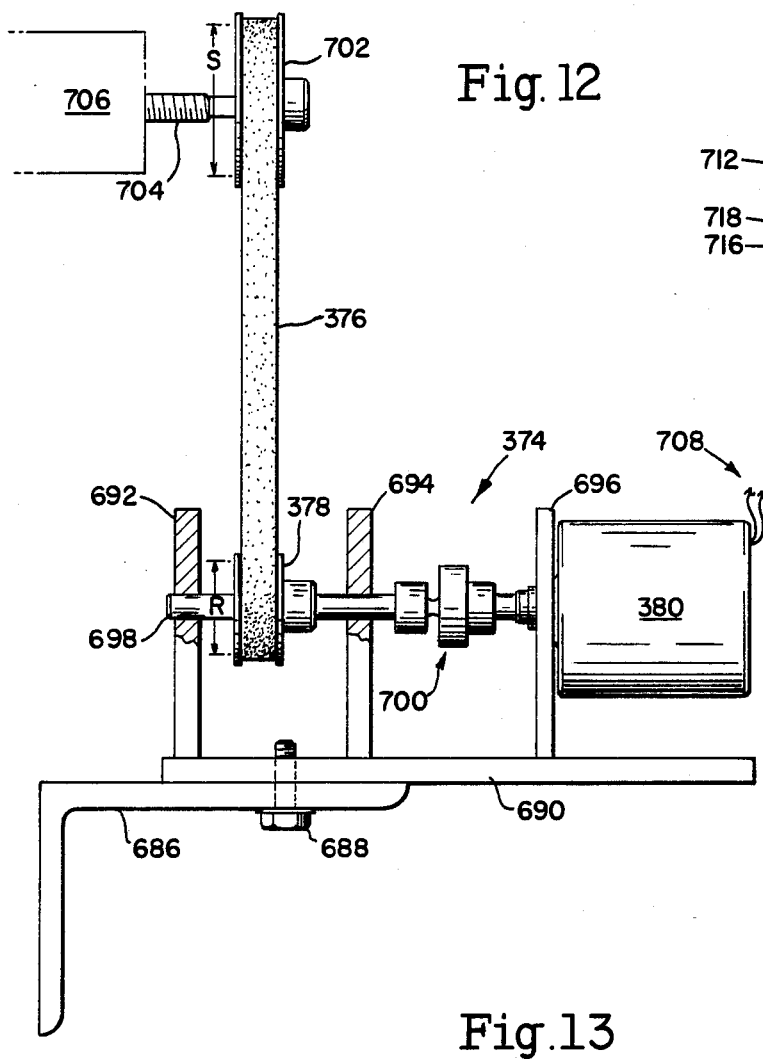
FIG. 12 shows a detailed view of the connection between one of the hydraulic motors employed for providing a pivotal movement for one of the saw blades and a linear potentiometer for measuring the pivotal movement.

FIG. 12 shows the details for a position transducer assembly 374 such as is shown mounted to the bottom of mounting plate 58 in FIG. 4A. The assembly 374 can be mounted to a mounting bracket 686 which is representative of other such brackets such as bracket 375 shown in FIG. 4A. A mounting bolt 688 can be provided to attach the transducer base 690 to the bracket 686. Three upright supports 692, 694 and 696 can be utilized for mounting the transducer 380 and a sheave shaft 698 through a coupling 700. The sheave 378 is mounted on shaft 698 and has teeth for meshing with internal teeth on drive timing belt 376 which is driven by a toothed sheave 702 connected to an output shaft 704 which is representative of any one of the various hydraulic motors illustrated as generic motor 706. Upon rotation of the hydraulic motor 706 which controls the movement of one of the adjustment elements in apparatus 20 output shaft 704 rotates the tooth sheave 702 which in turn transmits the movement via belt 376 to the bottom sheave 378 and then through shaft 698 and coupling 70 into the transducer or linear potentiometer 380. The transducer then produces a signal which is transmitted via conductors 708 to the automatic positioning mechanism described hereinafter.

Transducer assemblies 374 can be positioned for recording the angular position of the angulation plates for each of the six saw by mounting these transducers in the manner shown in FIG. 4A for saw No. 1. It is also possible to couple the transducers to all of the various hydraulic or electric motors in order to obtain a direct position readout capability in a similar fashion.

In the transducer assembly 374 as shown in FIG. 12 the diameters of the two sheaves 378 and 702 can be chosen so as to obtain a motion multiplication so that the full range of the transducer 380 can be employed. Useable transducers or linear potentiometers operate over their full range of voltage output in about ten turns. Thus, by appropriate sizing of the diameters S and R as shown in FIG. 12 it is possible to cause the transducer core to rotate nearly 10 times, and preferably about 8 times in order to generate a full voltage signal range with a safety factor. It has been found preferred to operate with a ratio of S/R of about 2. This range can vary from about 1.0 to about 3 for most of the available hydraulic motors 706 and linear potentiometers or transducers 380. A useable potentiometer 380 is supplied by Borg Co. as model 205 which has a 0 to 10 volt output signal range with a 1,000 ohm resistor.

The different angular movement ranges for the various angulation plates in apparatus 20 result in a range of rotations for the drive sheave 702. The sheave ratios S/R can be preferably adjusted as follows: (1) for saw Nos. 1 and 3 a ratio of 1:1; (2) for saw Nos. 2A and 4 a ratio of 2.5:1; and (3) for saw No. 2 a ratio of 2:1. Saw No. 5 is omitted here since in the present preferred commercial embodiment it is mounted to post 102 without an angulation plate.

Figure 21:
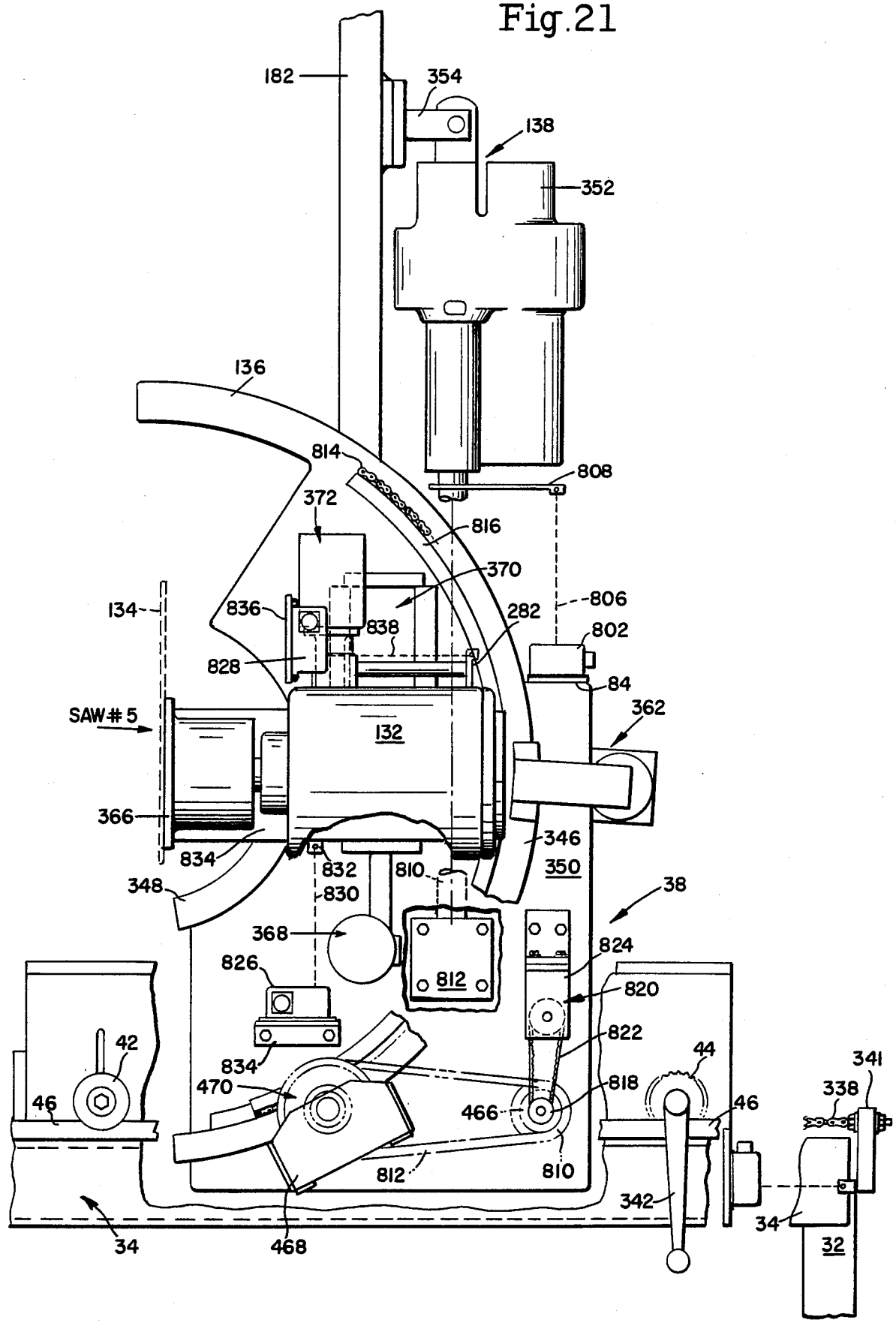
FIG. 21 shows the inclusion of position sensing devices on the saws in the apparatus of FIG. 1.

It is also possible to connect the transducers 380 to the various hydraulic or electric motors in other ways in order to obtain a direct revolution reading from the output 708 of the transducer. Such connects can be used for the x-y axes coordinate movements since these can be monitored and instrumented for automatic control. The x-axis movement is preferably 3 inches and the y-axis movement is designed for 6 inches. The same system can be employed for the vertical movement of the mounting plates since these are preferably a movement of about 6 inches. FIG. 21 shows the positioning and operation of such position transducers for the x-y axes movement.

Automatic Positioning Mechanism

Figure 13:
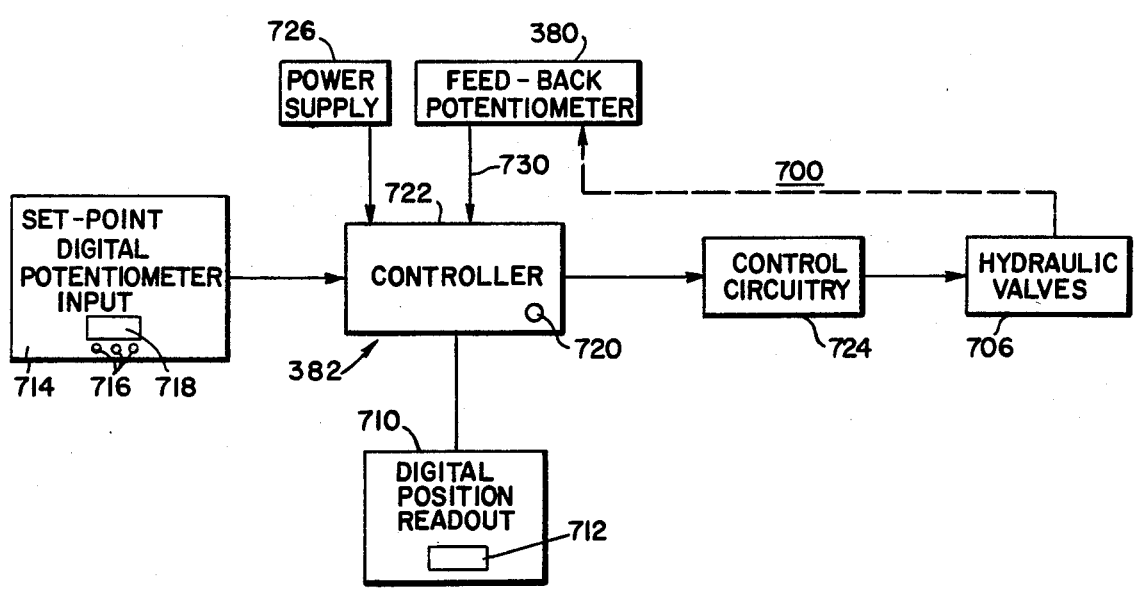
FIG. 13 shows a schematic diagram of the automatic positioning system employed as a part of the present invention.

The various hydraulic and electric motors utilized in apparatus 20 and the coupled transducers illustrated as element 380 are connected to the automatic positioning mechanism 382 which permits high speed automated control for achieving different positions of the saw blades in apparatus 20. FIG. 13 shows the control diagram for this automated system. A digital position readout 710 is provided with a display 712 for reflecting the positional information for each of the positioning movements utilized in apparatus 20. A separate display 712 can be provided for each of the four degrees of freedom for each of the saws in the apparatus. Thus an operator looking at the digital position readout panel which is a portion of the control panels 182 and 186 can immediately ascertain the angular position of the angulation plates as wellas the distance from base line for each of the linear movements of the six saws. Each of the digital position readout displays 712 is associated with a setpoint digital potentiometer input device 714 which has three or more digital input buttons 716 located immediately below a display window 718. When the operator desires to locate any of the saws to a different position he merely locates the set-point input display which is associated with that particular saw and movement capability and then inputs through the digital buttons 716 the desired position. He then depresses the control button 720 on the main controller panel 722 which is associated with the particular movement and the saw being adjusted. The set-point digital potentiometer input 714 then generates a voltage different from the voltage registered for the start position of the saw as reflected by the digital position readout display 712. That readout position is in turn determined by the position of the feedback potentiometer or transducer 380. The controller then, monitors this voltage differential and operates the control circuitry 724 in order to open the hydraulic valves 706 in a manner to lower the voltage differential. As hydraulic motor rotates the mechanical movement is transmitted via a mechanical feedback coupling line 700 to the feedback transducer 380 which in turn generates a voltage which registers a differential between the input voltage generated by device 714 and the position readout 710. The resulting voltage signal is transmitted through feedback loop line 730 to the controller 722. The control circuitry block 724 is of course capable of switching the valve positions for the hydraulic motors to operate in a forward or in a reverse direction as required to lower the voltage difference. A power supply means 726 is provided to supply electrical power for the automated positioning mechanism 382.

When the mechanism 382 is employed for automatically positioning the saws through control of electric motors such as preferably used for effecting the x-y axes movements, the hydraulic valves block 706 in FIG. 13 is replaced by a forward and reverse switching arrangement which can be designed with variable speed operation.

Figure 14:
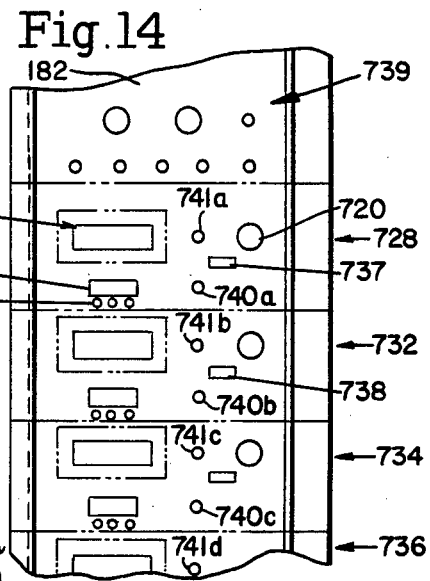
FIG. 14 shows a schematic diagram of a portion of the control panel aasociated with the automatic positioning mechanism in the present invention.

As shown in FIG. 14 a portion of the control panel 182 can be utilized to position multiple displays for enabling operator control over the various saws. As shown in FIG. 14 display area 728 can be arranged to contain the digital position readout 712 as well as the set-point digital input display 718. The controller button 720 can also be positioned so that once an input position is punched into the set-point potentiometer via buttons 716 and registered in display window 718 the controller button 720 can be depressed in order to set the feedback control circuit through line 730 into the zero voltage feedback servo mode of operation. A timing device (not shown) is operated by button 720 to permit the mechanism 382 including the feedback loop 730 to be powered through the controller block 722 during this feedback control operation. The display area 728 can be allocated to achieving automated control over the $F_1$ movement for saw No. 1, for example. Display area 732 can be similarly allocated to achieving control over the angulation plate movement for monitoring and controlling the $F_2$ movement of saw No. 1. In a similar fashion display areas 734 and 736 can be allocated to monitoring and controlling the x-y coordinate movements of $F_3$ and $F_4$ of the saw No. 1. When this pattern is repeated for all six saws wherein each is fitted with four degrees of freedom, 24 display areas are required which are then equally divided between the stationary display panel 182 and the carriage panel 186.

It is also possible to provide selector switches 737 and 738 for display areas 728 and 732, respectively, as well as for the other display areas in order to switch the displays between the various degrees of movement for each of the six saws. Thus, each of the displays can be arranged to reflect the different positional indications for the four degrees of freedom of each of the saws. When such a control system is employed only six display areas are required. Since the saw positions are changed by the operator one saw at a time, this more conservative use of multiple display capability for the individual display areas can be easily relied upon by also utilizing the larger display area 718 for a designation of the particular movement being displayed by both of the displays. The controller circuit can be a solid state Wheatstone bridge circuit which operates between the setpoint voltage and the readout positional voltage.

Various operating and warning lights and operators 739 are displayed on panels 182 and 186. Also it is a preferred practice to include a pilot light 740 in each of the panel display areas 728, 732, 734 and 736 for indicating activation of the powered feedback servo mode of operation of controller 722. These pilot lights 740a, b, c and d then remain on during the time delay period described above as initiated by depressing button 720. If the time period is insufficient for a given adjustment movement the light will go out and the operator must again depress the button 720 for additional adjustment motion. Also manual forward and reverse operators 741 can be provided for overriding the automatic feedback servo mode to position the saws by readings from sight scales.

A useable digital position readout 710 is available from Action Instruments, Co. of San Diego, Calif. under the name VISIPAK as Model V50 A-007-014-00. A push button digital display 718 can be obtained from Bourns Company under the name Knobbot, Model 36 A 3S-1 102-1K. Timing button 720 is obtainable from Square-D Company as Model 9001 KRD 1 UH1.

Four Saw Modification

A simplified four saw modification of apparatus 20 can be constructed by omitting saw Nos. 2A and 5. When such a simplified saw apparatus is to be constructed it is normal to provide saw Nos. 1 and 4 with four degrees of freedom as shown in FIGS. 1-9; saws 2 and 3 with three degrees of freedom as shown with respect to the first of these saws in FIG. 11. In such a four saw modification the control panel 182 will be also greatly simplified.

It is possible to illustrate the operation of such a four saw modification by a simplified diagram showing the angular movement and the y-axis movement of both of the saw blade sets in a single figure.

Figure 15:
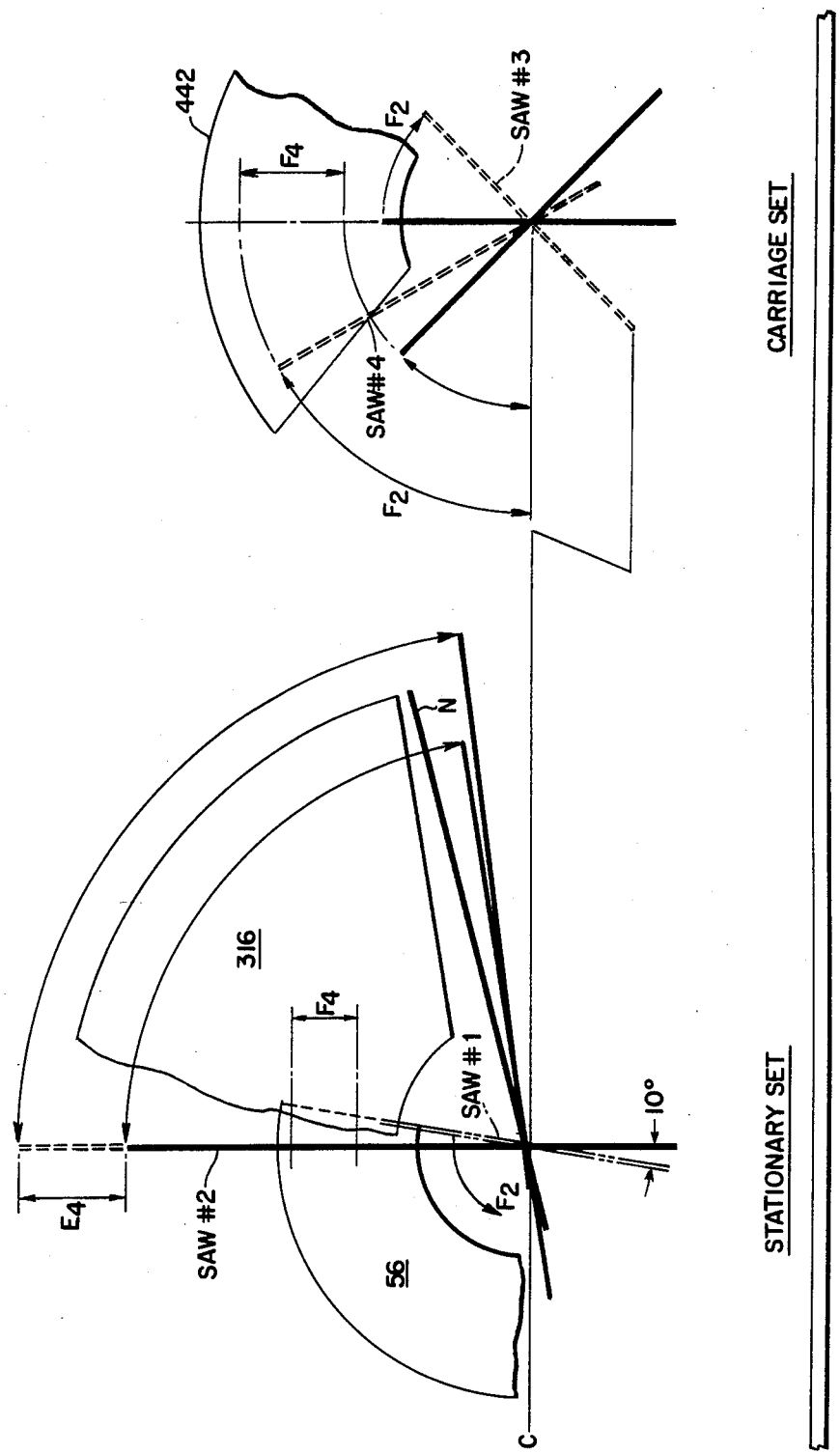
FIG. 15 is a schematic diagram of the positioning variability for the four saw modification of the present apparatus.

The stationary frame set of saws 1 and 2 are illustrated with respect to the angulation plates 56 and 316, respectively. The pivotal movement of saw No. 1 is shown as predominately in the counterclockwise direction which occurs by pivoting of angulation plate 56. As shown, saw No. 1 is mounted for a 10° pivot in a clockwise direction from the vertical position shown in FIG. 1. This additional 10° past the vertical permits certain heel cuts to be made advantageously on the apparatus 20 of the present invention. The x-y coordinate movements with respect to angulation plate 56 preserve this heel cutoff capability for the entire range of lumber lengths with which apparatus 20 is employed. Saw No. 1 can be rotated then counterclockwise from the phantom position shown to a nearly horizontal position such as shown by the construction line C in FIG. 15, stationary set. The y-axis movement, $F_4$, is also shown in this diagram for adjustment of the blade position for saw No. 1.

Saw No. 2 is pivotable from the solid line position shown in a clockwise direction to the two lower solid line positions shown. This saw is also adjustable in the y-axis direction to provide for movement $F_4$. The normal position for this 30 inch diameter scarfing blade is shown as position N in the Figure. This position produces a long scarfing cut on the lefthand top end of the lumber length and is the last of the lefthand cuts made prior to completion of the component production.

The carriage set of saws Nos. 3 and 4 on the righthand side shows the angulation plate 442 for saw No. 4. The usual angular variation for this saw number 4 is from a blade position shown in the bold line down to the horizontal position or from the raised phantom position downward to the horizontal as shown for the $F_2$ movement. The raised or lowered position is controlled by the y-axis movement $F_4$. In this four saw modification saw No. 3 is shown as not moving in a y-axis movement and hence, the center lines of the saw blade shown in bold line and in phantom line are the same.

FIG. 16 shows a restricted movement capability for saw No. 5. The motor 132 is mounted via bracket pair 742 on to a mounting block (not seen) which is retained within the motor slides 744 and 746. An end plate 748 is provided with a manual adjustment bolt 750 which is operable from either the right or lefthand sides of the motor slides 744 and 746. The motor slides are then bolted onto the mounting posts 102. The remaining portions of FIG. 16 are as described with respect to FIG. 4B. The sprocket chain 752 is shown with lumber length dogs 754 and 756 which engage successive lumber lengths under the holddown shoe 114.

X-Y Axes Coordinate Mechanism

Figure 17:
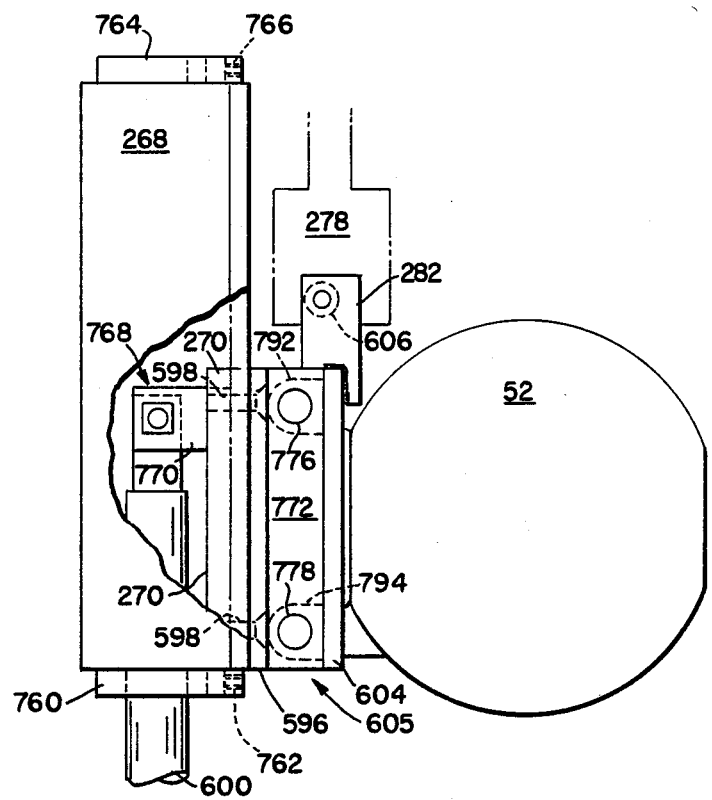
FIG. 17 shows a detailed side elevation view of the x-y coordinate movement mounting means employed for mounting the saws to the angulation plates.
Figure 18:
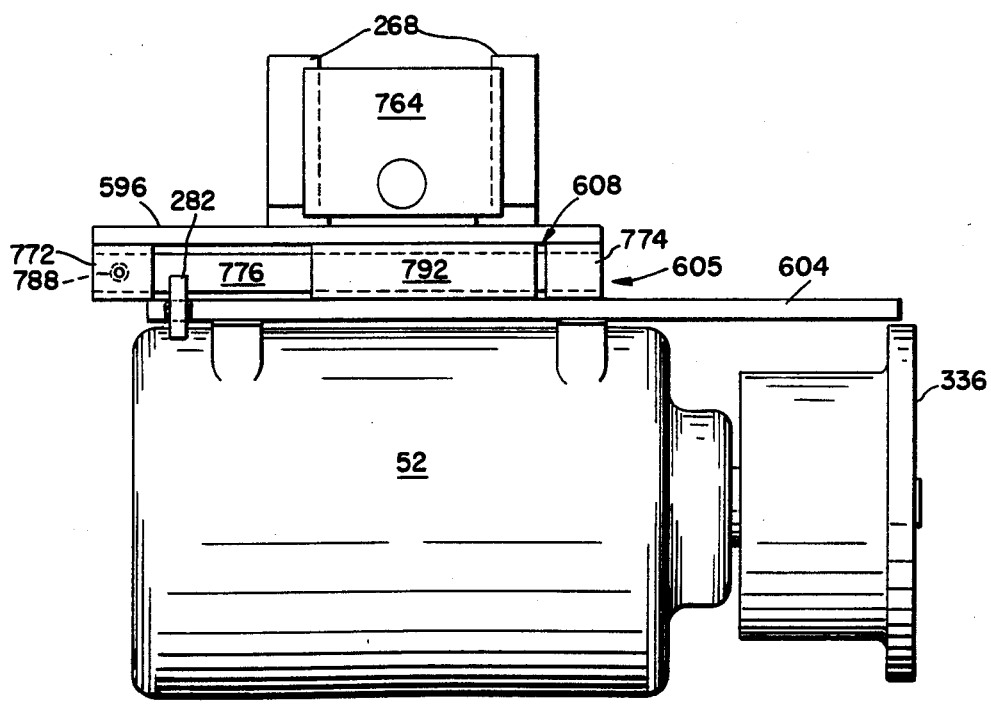
FIG. 18 shows a top plan view of the mounting means of FIG. 17.
Figures 19, 20:
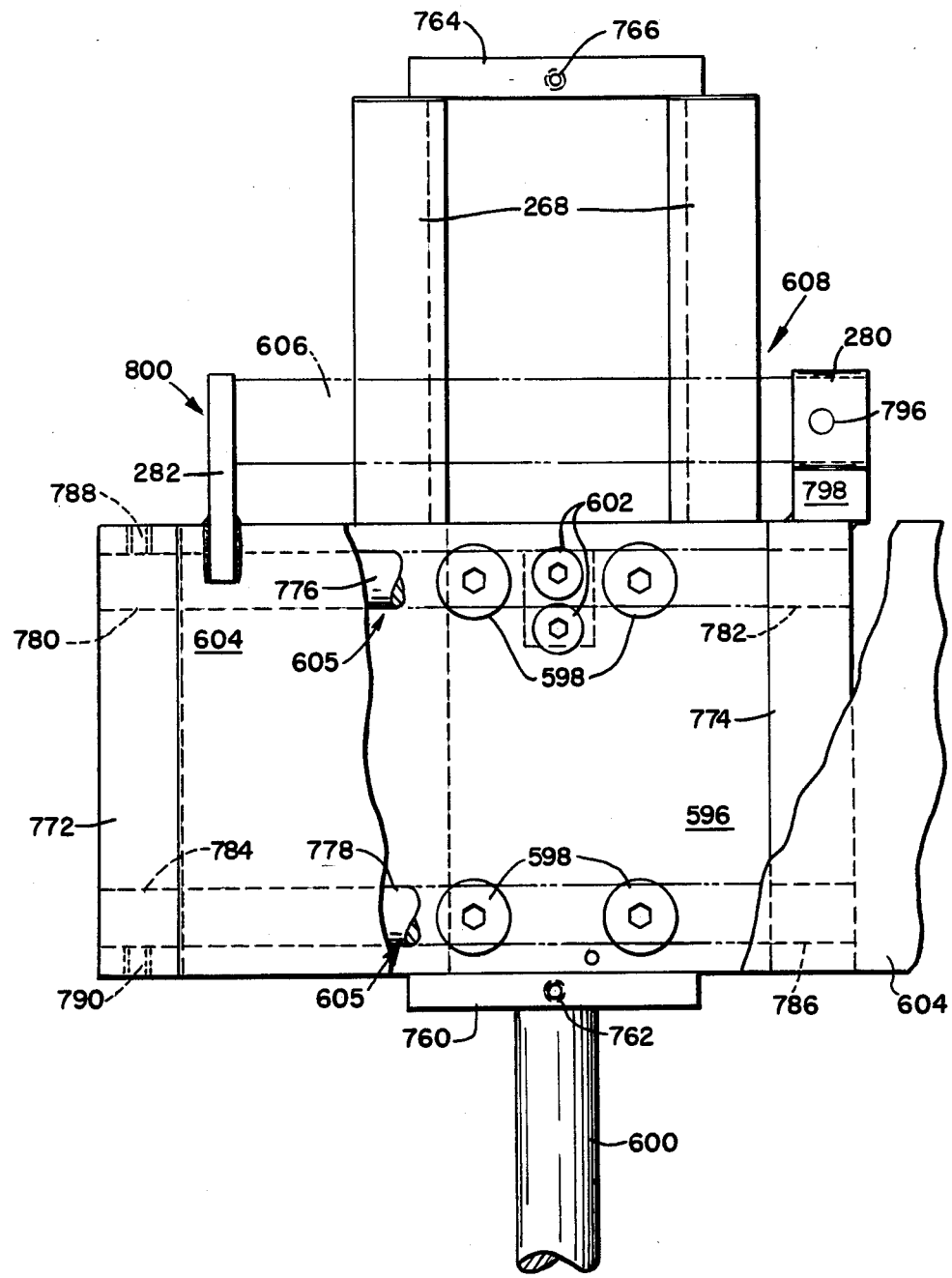
FIG. 19 shows a side view of the x-axis motor slide mount.
FIG. 20 shows a front plan view of the mounting means of FIG. 17.

FIGS. 17-20 show additional details for the x-y axes mechanism briefly described with respect to FIG. 9 above. In FIG. 17 one of the motor slides 268 can be seen with the linear actuator extension 600 entering through a bottom cover plate 760 which is provided with a connector 762. A top end cap 764 also having a connector 766 is provided. A pinned connector assembly 768 is provided on the end of the actuator extension 600 and is coupled to a slide flat 270 by screws 602 (shown in FIG. 9). A screw block 770 is provided as part of the connector assembly 768 for this purpose. An x-axis movement slide flat 596 is connected to the slide flat 270 by means of screws 598 which are also seen in FIG. 9. This x-axis slide flat 596 has shaft mounts 772 and 774 located at the right and lefthand sides as shown in FIGS. 18 and 19. Guide shaft 776 is positioned in top openings 780, 782, and shaft 778 is retained in bottom openings 784 and 786, respectively, as shown in FIG. 19. Set screw openings 788 and 790 are provided for securing these shafts at the lefthand side on the shaft mount 772. During installation of the guide shafts 776 and 778, slide guides 792 and 794 which are connected to motor support plate 604 are installed around the guide shafts 776 and 778. The support of the motor mounting plate 604 via the guide slides 792 and 794 provide for the x-axis movement of motor 52 and its associated reenforcing plate 336 to which the saw blade is attached.

In order to power this x-axis movement the linear actuator assembly 278 and its extending shaft 606 are connected between the bracket 280 and the follower 282. The linear actuator assembly 278 is fixed in a square internal cross-section bracket 280 via a pin inserted through hole 796. As shown in FIGS. 19 and 20 bracket 280 is mounted on the righthand shaft mounting 774 by a spacer block 798 and is offset from the plane of the shaft guide and sleeve assembly 605.

FIG. 18 shows the mounting of the saw motor 52 on its mounting plate 604 and the shaft guide and sleeve assembly 605 onto the x-axis slide flat 596 without the super imposed linear actuator assembly 278.

As shown in FIG. 18 a space 608 between the slide guide and the shaft mount 774 provides a safety against the actuator assembly 278 being broken by the contacting of the slide guide with the mount prior to the actuator reaching its limit of movement.

Feedback Position Instrumentation

The use of position transducer 380 for monitoring the angular position of angulation plate 56 for saw No. 1 was described with respect to FIG. 12 above. As stated above in the last paragraph of the "Position Transducer" section, position transducers can be connected to various elements within the saw apparatus 20 to monitor the changes in position of various movable elements. The use of such position transducers then provides feedback signals for the feedback control loop 730 shown in FIG. 13 for these various movable elements.

FIG. 21 shows the positioning of a number of such transducers on the movable carriage 38 for instrumenting the four degrees of movement provided for saw No. 5. Also shown is a position transducer for measuring the position of the movable carriage 38 relative to the carriage bench 34.

A first position transducer 802 for monitoring movement $F_1$ is secured by a base plate 804 to the top rear corner of mounting plate 350 and a stainless steel cable 806 which is provided with the transducer 802 is attached by its free end to support member 808 which is secured to mounting post 102. Movement of mounting plate 350 vertically by operation of the linear actuator assembly 138 through extendable member 810 and the bracket 812 which is attached to the rear side of mounting plate 350 produces relative motion with respect to the mounting posts which is then recorded by the position transducer 802. The electrical signal generated is utilized as a feedback signal in feedback loop 730 in FIG. 13 to provide controller 722 with the position indication for the mounting plate 350. This monitoring signal then establishes the elevation of the mounting plate 350 above a base line which then determines the vertical position of the pivot axis along which the saw No. 5 saw blade 134 operates.

The second degree of freedom of motion $F_2$ provided for saw No. 5 is the angular adjustment of angulation plate 136 which is provided by hydraulic motor 466 which drives a sprocket gear 810 which in turn operates the gear assembly 470 through a sprocket chain 812. The gear assembly 470 meshes with the angulation chain 814 positioned on backup member 816. Rotation of hydraulic motor 466 also rotates a toothed sheave 818 which is connected to a position transducer 820 via a timing belt 822. The transducer is supported on mounting plate by a bracket assembly 824. Position transducer 820 is of the same type as transducer 380 described with respect to FIG. 12 above in that its signal output is proportional to the number of revolutions transmitted via timing belt 822, thus recording in a positive manner, the revolutions of the gear assembly 470 which can be calibrated to the angular position of angulation plate 136. The mounting of transducer 820 on mounting plate 136 above gear 466 is preferred. The FIG. 4A mounting bracket 375 for transducer 380 is an alternate mounting means.

The third and fourth degrees of freedom of movement $F_3$ and $F_4$ provided for motor 132 and hence for saw No. 5 are achieved through the use of position transducers 826 for the y-axis movement and 828 for the x-axis movement. The position sensing cable 830 for transducer 826 is connected at connection 832 to the motor mount plate 834 for saw No. 5. Relative movement of motor 132 in the y-axis direction due to operation of electro-mechanical linear actuator 368 is monitored by transducer 826 as the length of the sensing cable 830 changes. This transducer 826 is mounted to mounting plate 350 by a bracket 834.

The x-axis movement is monitored by position transducer 828 which is supported on bracket 836 which is in turn attached to a common support for the electro-mechanical actuator assembly 372. The sensing cable 338 can be connected to the top of the follower 282 which moves the motor 132 in the x-axis direction.

The position transducers 802, 826, and 828 can be of a type provided by Celesco Transducers Products, Inc., a subsidiary of H.C.C. Industries in Canoga Park, Calif. 91304. Another such available transducer is produced by Genisco Technology Corp. of Simi Valley, Calif. and marketed as model BT50. These units produce a monitoring signal which is proportional to the length of the sensing cable which is drawn out of the transducer by the mechanical movement between the end of the cable and the transducer housing. A return spring mechanism is provided so that the cable return within the transducer when not attached in the manner of a spring biased return drum and cable system. The linear actuators for the x- and y- axes movements can be obtained from Motion Systems Corp. of Shrewbury, N.J. These actuators have load rations of 200 to 300 pounds, travel at 30 to 40 inches/min., and draw 2 amps (115 v. and 60 cps input).

The electro-mechanical linear actuators for the $F_1$ movements such as 62, 138 are selected to have a load rating of 1,500 pounds, to operate at 50 inches/min. and to draw 6.2 amps at 115 v. and 60 cps. A suitable actuator of this specification is available from Duff-Nordon Company of Charlotte, N.C. as Super Pac Model MP-A-6415.

The described preferred embodiments are to be understood as having differing evaluations on a time scale. The present preferred commercial embodiment of apparatus 20 has saw Nos. 1 and 4 arranged for all four degrees of movement; saw Nos. 2, 2A and 3 arranged for three degrees of movement (i.e., without x-axis translation); and saw No. 5 has a single degree of adjustability in a horizontal direction aligned with the carriage reciprocation movement. The future commercial practice is expected to move toward full automation of at least a majority of the saws for all four degrees of movement. The use of the full four degrees of movement for at least three saws in a four saw apparatus and 5 saws in a six saw apparatus are likely in the near term commercial practice of this invention. Full automation for all of the saws for four degrees of movement is also anticipated in the future.

The y-axis direction of movement for the various saws of apparatus 20 is positioned perpendicularly to the pivot axis for the saws in each of the sets of saws. Since it is not strictly necessary that the y-axis movement be in a plane perpendicular with the pivot axis an appropriate relationship will suffice. The x-axis movement will be arranged at an angular position with respect to a radial line from the pivot axis except when the center of the saw blade is positioned on a radial line. In most cutting operations the x-axis movement is used to move a given saw into contact position along the pivot axis or to retract it from contact. Both the x- and y- axes movements are used to adjust the saw blade of given saws to have the most efficient contact chord line across the blade surface which is a long chord length.

The pivot axes P.A. 1 and P.A. 2 shown in FIGS. 5A and 5B herein are operating lines about which the various saws are pivoted, and along which the saws of each set contact the lumber lengths. Movement of any one saw in the $F_1$ direction then has the effect of adjusting the vertical position of the pivot axis for the saw set in which that saw is positioned. That is, the line of contact which includes the cutting chord line for that one saw will be shifted. Such $F_1$ movement is effected by vertical adjustment of the mounting plates such as 5B for saw No. 1, 330 for saw No. 2A, and 350 for saw No. 5.

In the attached claims generic terminology has been employed for certain of the elements of the component saw apparatus. The following terms are explained with reference to the parts of the apparatus, and particularly saw No. 1, which provides descriptive basis for these generic terms. "Support means" refers to the base frame 22; "first structure" refers to the stationary frame 36 and "second structure" refers to the movable carriage 38. The term "saw" comprises a motor or motive means such as 50 and a saw blade 54. The "pivot axis" is the line about which the saws are pivoted with the axis passing along the saw blades in the direction of cutting such as Pivot Axis 1 in FIG. 5A. The term "adjustment means" refers to a motive means for changing angular positions of the saws in particular directions of movement. There is one "motive means" for each of the degrees of freedom shown for saw No. 1 such as linear actuator 62, x-axis motive means 188, y-axis motive means 262, and pivotal motive means 302. These motive means can be either electrical or hydraulic motors as described above.

The term "mounting means" includes the mounting plates for raising and lowering the saws to adjust the vertical position of the pivot axes. Mounting plate 58 is shown for saw No. 1. "Elevation means" refers to the linear actuators and motors such as 62 and 260. "Predetermined positions" refers to the positions decided on by an operator for successive new positions of the individual saws mounted within the apparatus. These positions are locked into the automatic positioning mechanism so that the saws automatically seek the desired position.

"Control system" refers to the automatic positioning mechanism 382. The term "position indicating or sensing means" refers to a transducer or potentiometer such as 380. A "position readout" or "position readout display" refers to element 712 in FIG. 14. "Set-point input means" is the block 714 of FIG. 14 and the "feedback controller" is block 710. The term "a majority of the saws" refers to three saws in the four saw embodiment and to at least four saws in the six saw preferred embodiment of the present application. A "multi-cut" component saw refers to a device such as apparatus 20 which has multiple saw blades.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A component saw comprising a base,
    a stationary structure affixed to said base and said structure containing at least two mounting frames spaced from one another,
    a carriage movable along said base and having at least two mounting frames contained therein,
    a first vertically adjustable mounting plate attached to a first of said mounting frames,
    a first angulation plate mounted on said first adjustable mounting plate for movement about a first pivot axis,
    a first motor means movably mounted on said first angulation plate and adapted for movement in an x-y coordinate plane arranged substantially perpendicularly to said pivot axis of said angulation plate,
    a circular saw blade affixed to the shaft of said motor means, and
    said motor means adapted for independent movement in a first direction of movement referenced to said base to position said saw blade with respect to said first mounting frame for adjusting the vertical position of said pivot axis, in a second direction of pivotal movement, and in third and fourth directions of movement within said x-y coordinate plane to permit four degrees of compound movement adjustablility for said saw blade,
    wherein a second adjustable mounting plate is attached to a second of said mounting frames, and wherein a second angulation plate is mounted on said second adjustable mounting plate for movement about a pivot axis, a second motor means movably mounted on said second angulation plate and adapted for movement in a y-axis direction lying approximately perpendicular to a radius line from said pivot axis to permit compound positioning of said second motor means in three degrees of freedom movement,
    wherein third and fourth adjustable mounting plates are attached to a third and a fourth of said mounting frames, and wherein third and fourth angulation plates are mounted on said adjustable mounting plates for movement about pivot axes, third and fourth motor means each movably mounted on said third and fourth angulation plates, respectively, and adapted for movement in a y-axis direction lying approximately perpendicularly to the pivot axis associated with the respective angulation plate to permit compound positioning of said third and fourth motor means in three degrees of freedom of movement, and said first motor means mounted to a first angulation plate and adjustable mounting plate in one of said stationary structure and said carriage, and said third and fourth motor means mounted in the other of said stationary structure and said carriage, said first and second motor means adapted for movement about a first pivot axis and said third and fourth motor means mounted for movement about a second of said pivot axes,
    wherein said angulation plates are connected with motive means adapted for automatic positioning of said angulation plates to predetermined angular positions to provide for said pivotal movements.

2. A component saw comprising a base,
    a stationary structures affixed to said base and said structure containing at least two mounting frames spaced from one another,
    a carriage movable along said base and having at least two mounting frames contained therein,
    a first vertically adjustable mounting plate attached to a first of said mounting frames,
    a first angulation plate mounted on said first adjustable mounting plate for movement about a first pivot axis,
    a first motor means movably mounted on said first angulation plate and adapted for movement in an x-y coordinate plane arranged substantially perpendicularly to said pivot axis of said angulation plate,
    a circular saw blade affixed to the shaft of said motor means, and said motor means adapted for independent movement in a first direction of movement referenced to said base to position said saw blade with respect to said first mounting frame for adjusting the vertical position of said pivot axis, in a second direction of pivotal movement, and in third and fourth directions of movement within said x-y coordinate plane to permit four degrees of compound movement adjustablility for said saw blade, wherein a second adjustable mounting plate is attached to a second of said mounting frames, and wherein a second angulation plate is mounted on said second adjustable mounting plate for movement about a pivot axis, a second motor means movably mounted on said second angulation plate and adapted for movement in a y-axis direction lying approximately perpendicular to a radius line from said pivot axis to permit compound positioning of said second motor means in three degrees of freedom movement, wherein third and fourth adjustable mounting plates are attached to a third and a fourth of said mounting frames, and wherein third and fourth angulation plates are mounted on said adjustable mounting plates for movement about pivot axes, third and fourth motor means each movably mounted on said third and fourth angulation plates, respectively, and adapted for movement in a y-axis direction lying approximately perpendicularly to the pivot axis associated with the respective angulation plate to permit compound positioning of said third and fourth motor means in three degrees of freedom of movement, and said first motor means mounted to a first angulation plate and adjustable mounting plate in one of said stationary structure and said carriage, and said third and fourth motor means mounted in the other of said stationary structure and said carriage, said first and second motor means adapted for movement about a first pivot axis and said third and fourth motor means mounted for movement about a second of said pivot axes, wherein said adjustable mounting plates are connected to motive means adapted for automotive positioning of said mounting plates to predetermined vertical positions to provide for vertical adjustment of the position of the respective pivot axes.

3. A compound saw comprising a base,
a stationary structure affixed to said base and said structure containing at least two mounting frames spaced from one another,
a carriage movable along said base and having at least two mounting frames contained therein,
a first vertcially adjustable mounting plate attached to a first of said mounting frames,
a first angulation plate mounted on said first adjustable mounting plate for movement about a first pivot axis,
a first motor means movably mounted on said first angulation plate and adapted for movement in an x-y coordinate plane arranged substantially perpendicularly to said pivot axis of said augulation plate,
a circular saw blade affixed to the shaft of said motor means, and
said motor means adapted for independent movement in a first direction of movement referenced to said base to position said saw blade with respect to said first mounting frame for adjusting the vertical position of said pivot axis, in a second direction of pivotal movement, and in third and fourth directions of movement within said x-y coordinate plane to permit four degrees of compound movement adjustability for said saw blade, wherein a second adjustable mounting plate is attached to a second of said mounting frames, and wherein a second angulation plate is mounted on said second adjustable mounting plate for movement about a pivot axis, a second motor means movably mounted on said second angulation plate and adapted for movement in a y-axis direction lying approximately perpendicular to a radius line from said pivot axis to permit compound positioning of said second motor means in three degrees of freedom movement, wherein third and fourth adjustable mounting plates are attached to a third and fourth of said mounting frames, and wherein third and fourth angulation plates are mounted on said adjustable mounting plates for movement about pivot axes, third and fourth motor means each movably mounted on said third and fourth angulation plates, respectively, and adapted for movement in a y-axis direction lying approximately perpendicularly to the pivot axis associated with the respective angulation plate to permit compound positioning of said third and fourth motor means in three degrees of freedom of movement, and said first motor means mounted to a first angulation plate and adjustable mounting plate in one of said stationary structure and said carriage, and said third and fourth motor means mounted in the other of said stationary structure and said carriage, said first and second motor means adapted for movement about a first pivot axis and said third and fourth motor means mounted for movement about a second of said pivot axes, wherein adjustable positioning means are attached to said motor means to provide for automatic positioning of said motor means to predetermined positions within said x-y coordinate plane and for movement in the y-axis direction.

4. A component saw according to claim 1 or 2 or 3 wherein a fifth adjustable mounting plate is attached to one of the mounting frames in said stationary structure, and wherein a fifth angulation plate is mounted on said fifth adjustable mounting plate for movement about said first pivot axis, a fifth motor means is movably mounted on said fifth angulation plate and is adapted for movement in a y-axis direction lying approximately perpendicularly to a radius line from said pivot axis to permit compound positioning of said second motor means in three degrees of freedom of movement.

5. A component saw according to claim 4, wherein separate motive means are attached to said first, second, third and fourth angulation plates for moving said plates to predetermined angular positions; and a control system is provided for operating said motive means and comprises, a position sensing means operatively connected to one of said motive means and said angulation plate of each motor means, an angular position readout display for indicating angular positions of said angulation plates, a set-point input means for displaying predetermined angular positions for said angulation plates, a feedback controller for controlling movement of said motive means, said feedback controller adapted to move said angulation plates from the postions indicated by said position readout display to the predetermined positions registered on said set-point input means.

6. A component saw according to claim 4, wherein separate motive means are attached to said first, second, third and fourth mounting plates for moving said plates to predetermined vertical positions; and a control system is provided for operating said motive means and comprises a position sensing means operatively connected to one of said motive means and said mounting plate for each of said motor means, a vertical position readout display for indicating vertical positions of said mounting plates, a set-point input means for displaying predetermined vertical positions for said mounting plates, a feedback controller for controlling movement of said motive means; said feedback controller adapted to move said mounting plates from the positions indicated by said position readout display to the predetermined positions registered on said set-point input means.

7. A component saw according to claim 4, wherein separate motive means are attached between said first, second, third and fourth motor means and the respective angulation plates for moving said motor means to predetermined positions along said x- and y-axes positions; and a control system is provided for operating said motive means and comprises, a position sensing means operatively connected between said motive means and said motor means for each of the x- and the y-axes of the coordinate planes, an x-axis and a y-axis position readout display for indicating positions of said motor means on said angulation plates, a set-point input means for displaying predetermined coordinate positions for said first, second, third and fourth motor means, and a feedback controller for controlling movement of said motive means, said feedback controller adapted to move said motor means from the position indicated by said position readout display to the predetermined positions registered on said setpoint input means.

8. A component saw comprising a base,
a stationary structure affixed to said base and said structure containing at least two mounting frames spaced from one another,
a carriage movable along said base and having at least two mounting frames contained therein,
a first vertically adjustable mounting plate attached to a first of said mounting frames,
a first angulation plate mounted on said first adjustable mounting plate for movement about a first pivot axis,
a first motor means movably mounted on said first angulation plate and adapted for movement in an x-y coordinate plate arranged substantially perpendicularly to said pivot axis of said angulation plate,
a circular saw blade affixed to the shaft of said motor means, and
said motor means adapted for independent movement in a first direction of movement referenced to said base to position said saw blade with respect to said first mounting frame for adjusting the vertical position of said pivot axis, in a second direction of pivotal movement, and in third and fourth directions of movement within said x-y coordinate plane to permit four degrees of compound movement adjustability for said saw blade, wherein a motive means is attached to said first angulation plate to provide for angular movement; and a control system is provided for operating said motive means and comprises a position sensing means operatively connected to one of said motive means and said angulation plate for said first motor means, an angular position readout display for indicating the angular position of said first angulation plate, a set-point input means for displaying a predetermined angular position, and a feed back controller for operating said motive means, said feed back controller adapted to move said angulation plate from a first readout displayed position to a predetermined input position registered on said set-point input means.

9. A component saw according to claim 8, wherein a motive means is attached to said fifth angulation plate to provide for angular movement; and a control system is provided for operating said motive means comprising a position sensing means operatively connected to one of said motive means and said angulation plate for said fifth motor means, an angular position readout display for indicating the angular position of said fifth angulation plate, a set-point input means for displaying a predetermined angular position, and a feedback controller for operating said motive means; said feedback controller adapted to move said angulation plate from a first readout displayed position to a predetermined input position registered on said set-point input means.

10. A component saw comprising a base,
a stationary structure affixed to said base and said structure containing at least two mounting frames spaced from one another,
a carriage movable along said base and having at least two mounting frames contained therein,
a first vertically adjustable mounting plate attached to a first of said mounting frames,
a first angulation plate mounted on said first adjustable mounting plate for movement about a first pivot axis,
a first motor means movably mounted on said first angulation plate and adapted for movement in an x-y coordinate plane arranged substantially perpendicularly to said pivot axis of said angulation plate,
a circular saw blade affixed to the shaft of said motor means, and
said motor means adapted for independent movement in a first direction of movement referenced to said base to position said saw blade with respect to said first mounting frame for adjusting the vertical position of said pivot axis, in a second direction of pivotal movement, and in third and fourth directions of movement within said x-y coordinate plane to permit four degrees of compound movement adjustability for said saw blade, wherein a motive means is attached to said first adjustable mounting plate to provide for vertical movement; and a control system is included for operating said motive means and comprises a position sensing means operatively connected to one of said motive means and said first mounting plate, a vertical position readout display for indicating the vertical position of said first mounting plate, a set-point input means for displaying a predetermined vertical position, and a feedback controller for operating said motive means; said feedback controller adapted to move said mounting plate from a first readout displayed position to a predetermined input position registered on said set-point input means.

11. A component saw comprising a base, a stationary structure affixed to said base and said structure containing at least two mounting frames spaced from one another, a carriage movable along said base and having at least two mounting frames contained therein, a first vertically adjustable mounting plate attached to a first of said mounting frames, a first angulation plate mounted on said first adjustable mounting plate for movement about a first pivot axis, a first motor means movably mounted on said first angulation plate and adapted for movement in an x-y coordinate plane arranged substantially perpendicularly to said pivot axis of said angulation plate, a circular saw blade affixed to the shaft of said motor means, and said motor means adapted for independent movement in a first direction of movement referenced to said base to position said saw blade with respect to said first mounting frame for adjusting the vertical position of said pivot axis, in a second direction of pivotal movement, and in third and fourth directions of movement within said x-y coordinate plane to permit four degrees of compound movement adjustability for said saw blade, wherein motive means are attached between said first motor means and said first angulation plate to provide movement in said x-y coordinate plane; and a control system is provided for operating said motive means and comprises position sensing means operatively connected between said motive means and said first motor means for each of the x- and the y-axes of said coordinate plane, x- and y-axes position readout display means for indicating the position of said first motor means within said coordinate plane, a set-point input means for displaying a predetermined coordinate position, and a feedback controller for operating said motive means; said feedback controller adapted to move said first motor means from a first readout displayed position to a predetermined input position registered on said set-point input means.

12. A component saw comprising a base, a stationary structure affixed to said base and said structure containing at least two mounting frames spaced from one another, a carriage movable along said base and having at least two mounting frames contained therein, a first vertically adjustable mounting plate attached to a first of said mounting frames, a first angulation plate mounted on said first adjustable mounting plate for movement about a first pivot axis, a first motor means movably mounted on said first angulation plate and adapted for movement in an x-y coordinate plane arranged substantially perpendicularly to said pivot axis of said angulation plate, a circular saw blade affixed to the shaft of said motor means, and said motor means adapted for independent movement in a first direction of movement referenced to said base to position said saw blade with respect to said first mounting frame for adjusting the vertical position of said pivot axis, in a second direction of pivotal movement, and in third and fourth directions of movement within said x-y coordinate plane to permit four degrees of compound movement adjustability for said saw blade, wherein a waste conveyor is arranged within said base for carrying off sawdust and scrap ends from lumber lengths cut by said component saw.

13. A component saw comprising a base, a stationary structure affixed to said base and said structure containing at least two mounting frames spaced from one another, a carriage movable along said base and having at least two mounting frames contained therein, a first vertically adjustable mounting plate attached to a first of said mounting frames, a first angulation plate mounted on said first adjustable mounting plate for movement about a first pivot axis, a first motor means movably mounted on said first angulation plate and adapted for movement in an x-y coordinate plane arranged substantially perpendicularly to said pivot axis of said angulation plate, a circular saw blade affixed to the shaft of said motor means, and said motor means adapted for independent movement in a first direction of movement refereneced to said base to position said saw blade with respect to said first mounting frame for adjusting the vertical position of said pivot axis, in a second direction of pivotal movement, and in third and fourth directions of movement within said x-y coordinate plane to permit four degrees of compound movement adjustability for said saw blade, wherein a safety switch assembly is provided on the operators side of said component saw for shutting down operation of said saws in a forced manner.

14. A component saw comprising a base, a stationary structure affixed to said base and said structure containing at least two mounting frames spaced from one another, a carriage movable along said base and having at least two mounting frames contained therein, a first vertically adjustable mounting plate attached to a first of said mounting frames, a first angulation plate mounted on said first adjustable mounting plate for movement about a first pivot axis, a first motor means movably mounted on said first angulation plate and adapted for movement in an x-y coordinate plane arranged substantially perpendicularly to said pivot axis of said angulation plate, a circular saw blade affixed to the shaft of said motor means, and said motor means adapted for independent movement in a first direction of movement referenced to said base to position said saw blade with respect to said first mounting frame for adjusting the vertical position of said pivot axis, in a second direction of pivotal movement, and in third and fourth directions of movement within said x-y coordinate plane to permit four degrees of compound movement adjustability for said saw blade, wherein a second adjustable mounting plate is attached to a second of said mounting frames, and wherein a second angulation plate is mounted on said second adjustable mounting plate for movement about a pivot axis, a second motor means movably mounted on said second angulation plate and adapted for movement in a y-axis direction lying approximately perpendicular to a radius line from said pivot axis to permit compound positioning of said second motor means in three degrees of freedom movement, wherein third and fourth adjustable mounting plates are attached to a third and a fourth of said mounting frames, and wherein third and fourth angulation plates are mounted on said adjustable mounting plates for movement about pivot axes, third and fourth motor means each movably mounted on said third and fourth angulation plates, respectively, and adapted for movement in a y-axis direction lying approximately perpendicularly to the pivot axis associated with the respective angulation plate to permit compound positioning of said third and fourth motor means in three degrees of freedom of movement, and said first motor means mounted to a first angulation plate and adjustable mounting plate in one of said stationary structure and said carriage, and said third and fourth motor means mounted in the other of said stationary structure and said carriage, said first and second motor means adapted for movement about a first pivot axis and said third and fourth motor means mounted for movement about a second of said pivot axes, wherein a fifth adjustable mounting plate is attached to one of the mounting frames in said stationary structure, and wherein a fifth angulation plate is mounted on said fifth adjustable mounting plate for movement about said first pivot axis, a fifth motor means is movably mounted on said fifth angulation plate and is adapted for movement in a y-axis direction lying approximately perpendicularly to a radius line from said pivot axis to permit compound positioning of said second motor means in three degrees of freedom of movement, wherein a sixth adjustable mounting plate is attached to one of said mounting frames contained in said movable carriage, and wherein a sixth motor means is movably mounted on said adjustable mounting plate and adapted for movement parallel to the movement of said movable carriage to permit reciprocal positioning of said sixth motor means with respect to said movable carriage.

* * * * *